United States Patent
Dumbuya et al.

(10) Patent No.: US 10,724,411 B2
(45) Date of Patent: Jul. 28, 2020

(54) PT/PD DOC WITH ENHANCED CO OXIDATION, HYDROCARBON OXIDATION AND NO OXIDATION AND IMPROVED SULFATION/DESULFATION BEHAVIOR

(71) Applicant: BASF Corporation, Florham Park, NJ (US)

(72) Inventors: Karifala Dumbuya, Hannover (DE); Claudia Zabel, Hannover (DE); Shiang Sung, Florham Park, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/484,874

(22) PCT Filed: Mar. 13, 2018

(86) PCT No.: PCT/EP2018/056227
§ 371 (c)(1),
(2) Date: Aug. 9, 2019

(87) PCT Pub. No.: WO2018/167055
PCT Pub. Date: Sep. 20, 2018

(65) Prior Publication Data
US 2019/0383184 A1 Dec. 19, 2019

(30) Foreign Application Priority Data
Mar. 14, 2017 (EP) .................................... 17160817

(51) Int. Cl.
*F01N 3/10* (2006.01)
*B01J 23/00* (2006.01)
*B01J 35/00* (2006.01)
*B01J 35/02* (2006.01)
*B01J 35/04* (2006.01)
*B01J 37/00* (2006.01)
*B01J 37/02* (2006.01)

(52) U.S. Cl.
CPC ............ *F01N 3/101* (2013.01); *B01J 23/002* (2013.01); *B01J 35/0006* (2013.01); *B01J 35/023* (2013.01); *B01J 35/04* (2013.01); *B01J 37/0036* (2013.01); *B01J 37/0219* (2013.01); *F01N 2370/02* (2013.01); *F01N 2510/0684* (2013.01)

(58) Field of Classification Search
CPC .............. B01D 53/9445; B01D 53/945; B01D 53/9454; B01D 53/9468; B01D 2255/102; B01D 2255/9027; B01D 2258/012; B01D 2255/20738; B01J 23/40; B01J 23/745; B01J 37/00; B01J 37/0215; F01N 3/101; F01N 2570/10; F01N 2570/12; F01N 2570/14
See application file for complete search history.

(56) References Cited

U.S. PATENT DOCUMENTS

2005/0227867 A1* 10/2005 Chen .................... B01D 53/945
502/325
2015/0165422 A1 6/2015 Sung et al.

FOREIGN PATENT DOCUMENTS

| WO | WO 2009/097702 A1 * | 8/2008 | ............. B01J 23/63 |
| WO | WO 2013/042080 A1 | 3/2013 | |
| WO | WO 2015/095056 A1 | 6/2015 | |
| WO | WO 2017/019958 A1 | 2/2017 | |

OTHER PUBLICATIONS

International Search Report and Written Opinion dated Jun. 12, 2018 in PCT/EP2018/056227 filed on Mar. 13, 2018.
International Preliminary Report on Patentability and Written Opinion dated Sep. 26, 2019 in PCT/EP2018/056227, 8 pages.

* cited by examiner

*Primary Examiner* — Timothy C Vanoy
(74) *Attorney, Agent, or Firm* — Oblon, McClelland, Maier & Neustadt, L.L.P.

(57) ABSTRACT

A diesel oxidation catalyst, containing a washcoat containing four layers, the washcoat being disposed on a substrate, wherein the washcoat contains: a first layer containing a first platinum group metal supported on a first metal oxide support material, wherein the first layer is disposed on the substrate; a second layer containing a second platinum group metal supported on a second metal oxide support material, and containing a fifth platinum group metal, wherein the second layer is disposed on the first layer; a third layer containing a third platinum group metal supported on a third metal oxide support material and containing a zeolitic material containing Fe and containing a sixth platinum group metal; and a fourth layer containing a fourth platinum group metal and a fourth metal oxide.

15 Claims, 9 Drawing Sheets

PT/PD DOC WITH ENHANCED CO OXIDATION, HYDROCARBON OXIDATION AND NO OXIDATION AND IMPROVED SULFATION/DESULFATION BEHAVIOR

The present invention relates to a diesel oxidation catalyst (DOC) for the oxidation of nitrogen monoxide (NO), the oxidation of a hydrocarbon (HC) and the oxidation of carbon monoxide (CO). Further, the present invention relates to a system for treating an exhaust gas, the system comprising the diesel oxidation catalyst, wherein the diesel oxidation catalyst is preferably located upstream of a catalyzed soot filter, preferably a catalyzed soot filter comprising a catalytic component for selective catalytic reduction (SCRoF). In addition to that, the present invention relates to a process for preparing the diesel oxidation catalyst.

In general, all light-duty's exhaust gas treatment systems particularly in North America and the EU are equipped with a diesel oxidation catalyst due to regulatory requirements. However, future diesel systems with a DOC or a $NO_x$ Adsorption DOC (NA-DOC) including an optional SCRoF require a new DOC fulfilling the aspects of (1) an improved CO conversion and an improved hydrocarbon conversion, in particular at a lower ECE temperature, (2) an improved sulfation/desulfation behavior particularly in lean diesel operations and (3) an improved NO oxidation, in particular under light-off and transient conditions. Accordingly, the present invention relates to a diesel oxidation catalyst particularly including the function to adsorb NON. The resulting $NO_x$ Adsorption DOC can adsorb NOx especially at comparatively low temperatures and can also enhance the oxidation of CO in particular at comparatively low temperatures. Thus, the present invention is targeted at light-duty diesel systems, preferably including a SCRoF. Accordingly, the diesel oxidation catalyst of the present invention is intended to be used in systems for European and US Diesel engine pollution abatement.

WO 2013/042080 A1 relates to a diesel oxidation catalyst (DOC) comprising a) a carrier substrate, b) a diesel oxidation catalytic material comprising b1) a first layer located on the carrier substrate, the first layer comprising palladium impregnated on a support material comprising ceria in an amount of at least 45 weight-% based on the total weight of the support material, and optionally comprising platinum; b2) a second layer located on the first layer, the second layer comprising palladium and platinum each impregnated on a support material comprising a metal oxide; wherein the platinum to palladium weight ratio of the first layer is lower than the platinum to palladium weight ratio of the second layer. In a preferred embodiment, a third layer may be applied on the second layer, the third layer comprising palladium impregnated on a support material comprising ceria in an amount of at least 45 weight-% based on the total weight of the support material, and optionally comprising platinum, wherein the platinum to palladium weight ratio of the third layer is lower than the platinum to palladium weight ratio of the second layer.

Further, WO 2015/095056 discloses an oxidation catalyst composite comprising a first washcoat layer comprising a first refractory metal oxide support, a platinum component and a palladium component and a second washcoat layer including a second refractory metal oxide support containing manganese, a zeolite and a platinum component. Finally, WO 2017/019958 A1 discloses, in one embodiment, an oxidation catalyst composite for abatement of exhaust gas emission from a lean burn engine which comprises three layers disposed on a substrate, an under layer on a carrier substrate comprising a first refractory metal oxide support, a rare earth oxide component, palladium and no platinum, a middle layer on the under layer comprising a second refractory metal oxide support, platinum and palladium and no rare earth oxide and a protective layer on the middle layer comprising a third refractory metal oxide support, platinum, a molecular sieve promoted with one or more of Cu, Fe, Co, Ni, Mn, V and Ag.

Thus, it has surprisingly been found that a diesel oxidation catalyst comprising a washcoat comprising four layers, the washcoat being disposed on a substrate, wherein the washcoat comprises
a first layer comprising a first platinum group metal supported on a first metal oxide support material, which first layer is disposed on the substrate;
a second layer comprising a second platinum group metal supported on a second metal oxide support material, and comprising a fifth platinum group metal, which second layer is disposed on the first layer;
a third layer comprising a third platinum group metal supported on a third metal oxide support material and comprising a zeolitic material comprising Fe and comprising a sixth platinum group metal;
and a fourth layer comprising a fourth platinum group metal and a fourth metal oxide;
wherein the substrate has a length, a front end and a rear end;
wherein the first layer is disposed on the substrate on the entire length of the substrate,
wherein the second layer is disposed on the first layer on the entire length of the substrate;
wherein the third layer is at least partially disposed on the second layer on x % of the length of the substrate from the front end of the substrate;
wherein the fourth layer is at least partially disposed on the second layer on y % of the length of the substrate from the rear end of the substrate;
wherein x is in the range of from 30 to 70, y is in the range of from 30 to 70 and x+y is in the range of from 95 to 115, shows an improved performance in view of CO oxidation, NO oxidation and of the oxidation of a hydrocarbon as well as an improved behavior relative to sulfation/desulfation. As regards the sulfation/desulfation behavior it has been found out that a diesel oxidation catalyst according to the present invention recovers from sulfation without showing significantly weaker performance in view of CO oxidation, NO oxidation and of oxidation of a hydrocarbon. In addition to that, a diesel oxidation catalyst according to the present invention is able to generate a favorable temperature, i.e. an exotherm, for heating a downstream catalyzed soot filter (CSF) or a downstream catalyzed soot filter comprising a catalytic component for selective catalytic reduction (SCRoF).

In particular, a diesel oxidation catalyst comprising a substrate, a first layer comprising palladium on ceria and/or lanthana-alumina, a second layer comprising platinum on alumina and palladium on alumina, a third layer disposed from the front end of the substrate, thus, forming an inlet zone, the third layer comprising platinum, palladium on alumina and a zeolitic material comprising Fe and a fourth layer disposed from the rear end of the substrate, thus, forming an outlet zone, comprising platinum on alumina doped with manganese achieves a high conversion of CO, NO and of a hydrocarbon and shows improved behavior relative to sulfation/desulfation.

Preferably, the diesel oxidation catalyst has a four layer design comprising:

(a) a first layer (undercoat) containing Pd supported on ceria and/or on lanthana-alumina;
(b) a second layer (sandwich coat) containing Pt and/or Pd supported on alumina;
(c) a third layer (topcoat forming an inlet zone) comprising Pt, Pd supported on alumina and a zeolitic material comprising Fe, preferably a beta zeolite comprising Fe; and
(d) a fourth layer (topcoat forming an outlet zone) comprising Pt supported on alumina doped with manganese.

Alternatively, since both the third and the fourth layer form the top coat (preferably in the form of a top inlet layer and a top outlet layer), and since the four layers mentioned above are preferably applied using 4 washcoat slurries, the diesel oxidation could also be described as exhibiting a 3-layer 4-washcoat design.

There is no particular restriction as regards the number of layers the washcoat comprises. However, it is preferred that the washcoat comprises four layers being the first, second, third and fourth layer. More preferably, the washcoat consists of four layers being the first, second, third and fourth layer.

As regards the first layer, it is defined that it is disposed on the substrate on the entire length of the substrate. As regards the second layer, it is defined that it disposed on the first layer on the entire length of the substrate.

The third layer may be designated as inlet topcoat and, thus, forms an inlet zone. It is defined that the third layer is disposed at least partially on the second layer from the front end of the substrate. As regards the length of the third layer, it is defined that it has a length of x % of the length of the substrate. The fourth layer may be designated as outlet topcoat and, thus, forms an outlet zone. It is defined that the fourth layer is disposed at least partially on the second layer from the rear end of the substrate. As regards the length of the fourth layer, it is defined that it has a length of y % of the length of the substrate. Since it is defined that x is in the range of from 30 to 70 and y is in the range of from 30 to 70 said two layers may overlap, be aligned end-to-end, or form a gap resulting in a portion of the substrate not having a layer disposed thereon. Since it is defined that x+y is in the range of from 95 to 115, a possible overlap may have a length in the range of from greater than 0 to 15% of the length of the substrate, thus 15% of the length of the substrate as maximum, whereas a possible gap may have a length in the range of from greater than 0 to 5% of the length of the substrate, thus 5% of the length of the substrate as maximum. It is preferred, however, that the two layers are aligned end-to-end.

Within the above definition of the length of the third layer, there exists no further restriction as to its length. As defined above, x is in the range of from 30 to 70. Preferably, x is in the range of from 35 to 65. More preferably, x is in the range of from 40 to 60, more preferably in the range of from 45 to 55, and more preferably in the range of from 49 to 51. It is particularly preferred that x is 50.

Within the above definition of the length of the fourth layer, again there exists no further restriction as to its length. As defined above, y is in the range of from 30 to 70. Preferably, y is in the range of from 35 to 65. More preferably, y is in the range of from 40 to 60, more preferably in the range of from 45 to 55, and more preferably in the range of from 49 to 51. It is particularly preferred that y is 50.

It is particularly preferred that x is 50 and y is 50 such that x+y is 100 resulting in a diesel oxidation catalyst wherein the third layer and the fourth layer are aligned end-to-end.

As regards the sum of x and y, there exists no further restriction apart from the above mentioned definition that x+y is in the range from 95 to 115. It is preferred that x+y is in the range of from 96 to 110, more preferably in the range of from 97 to 105, more preferably in the range of from 98 to 102 and more preferably in the range of from 99 to 101. It is particularly preferred that x+y is 100.

It is particularly preferred that the third layer is at least partially disposed on the second layer on x % of the length of the substrate from the front end of the substrate, and wherein the fourth layer is at least partially disposed on the second layer on y % of the length of the substrate from the rear end of the substrate, wherein x is 50, y is 50 and x+y is 100.

Thus, it is particularly preferred that the diesel oxidation catalyst of the present invention comprises a substrate and a washcoat comprising a first layer, a second layer, a third layer and a fourth layer, wherein the substrate has a substrate length, a front end and a rear end, wherein the first layer is disposed on the substrate on the entire length of the substrate, the second layer is disposed on the first layer on the entire length of the substrate, wherein the third layer is at least partially disposed on the second layer on 50% of the length of the substrate from the front end of the substrate, wherein the fourth layer is at least partially disposed on the second layer on 50% of the length of the substrate from the rear end of the substrate, wherein the first layer comprises a first platinum group metal supported on a first metal oxide support material, wherein the second layer comprises a second platinum group metal supported on a second metal oxide support material, and comprises a fifth platinum group metal, wherein the third layer comprises a third platinum group metal supported on a third metal oxide support material and comprises a zeolitic material comprising Fe and comprises a sixth platinum group metal, and wherein the fourth layer comprises a fourth platinum group metal and a fourth metal oxide.

Concerning the substrate onto which the washcoat comprising four layers is provided in the inventive catalyst, no particular restrictions apply such that any suitable substrate may be provided to this effect, provided that a washcoat may be disposed thereon. In particular, the type of substrate which may be contained in the inventive catalyst is restricted neither with respect to its shape nor with respect to the materials of which it consists.

Thus, the substrate contained in the inventive catalyst may comprise any suitable substance or substances, wherein the substrate preferably comprises one or more of a ceramic and a metallic substance, and preferably comprises a ceramic substance. Among the preferred ceramic substances, it is particularly preferred that the substrate comprises one or more of alumina, silica, silicates, aluminosilicates, aluminotitanates, silicon carbide, cordierite, mullite, zirconia, spinel, magnesia, and titania, more preferably one or more of alpha-alumina, aluminotitanates, silicon carbide, and cordierite, more preferably one or more of $Al_2TiO_5$, SiC, and cordierite, wherein more preferably the substrate comprises cordierite, wherein more preferably the substrate consists of cordierite. Independently thereof, the shape of the substrate comprised in the inventive catalyst may, by way of example, be one or more of a granule, a pellet, a mesh, a ring, a sphere, a cylinder, a hollow cylinder and a monolith, wherein the substrate is preferably a monolith, more preferably a honeycomb monolith, wherein the honeycomb monolith is preferably a wall-flow or flow-through monolith, preferably a flow-through monolith. It is particularly preferred that the substrate is a cordierite flow-through honeycomb monolith.

Further, it is preferred according to the present invention that the substrate has a plurality of longitudinally extending passages formed by longitudinally extending walls bounding and defining the passages and a longitudinal total length extending between a front end and a rear end of the substrate.

As regards the first platinum group metal comprised in the first layer, any suitable platinum group metal can be employed, provided that it can be supported on a metal oxide support material. Preferably, the first platinum group metal is one or more of Ru, Rh, Pd, Os, Ir and Pt. More preferably, the first platinum group metal is one or more of Rh, Pd and Pt, more preferably one or more of Pd and Pt, and more preferably Pd.

Further, there is in principle no particular restriction as to the loading of the first platinum group metal. Preferably, the loading of the first platinum group metal comprised in the first layer is in the range of from 10 to 60 $g/ft^3$, more preferably of from 20 to 40 $g/ft^3$, more preferably of from 26 to 36 $g/ft^3$, more preferably of from 28 to 34 $g/ft^3$, and more preferably of from 30 to 32 $g/ft^3$.

With respect to the first metal oxide support material comprised in the first layer, any suitable metal oxide support material can be employed, provided that it can be used as a support for the first platinum group metal. Preferably, the first metal oxide support material is one or more of gamma-alumina, zirconia-alumina, silica-alumina, lanthana, lanthana-alumina, silica-zirconia-lanthana, alumina doped with manganese, alumina-zirconia-lanthana, titania, zirconia-titania, neodymia, praseodymia, ceria-zirconia, ceria-alumina, baria-ceria-alumina and ceria, preferably one or more of gamma-alumina, lanthana-alumina, alumina-zirconia-lanthana, ceria-alumina and ceria, more preferably gamma-alumina, lanthana-alumina and ceria, more preferably one or more of lanthana-alumina and ceria, and more preferably lanthana-alumina and ceria.

There is in principle no particular restriction as to the loading of the first metal oxide support material comprised in the first layer. Preferably, the first metal oxide support material is comprised in the first layer at a loading in the range of from 0.2 to 2.5 $g/in^3$, preferably of from 0.5 to 2.0 $g/in^3$, more preferably of from 0.9 to 1.9 $g/in^3$, more preferably of from 1.2 to 1.8 $g/in^3$, and more preferably of from 1.4 to 1.6 $g/in^3$.

It is particularly preferred that the first platinum group metal supported on the first metal oxide support material is Pd supported on lanthana-alumina and ceria.

As regards the second platinum group metal comprised in the second layer, any suitable platinum group metal can be employed, provided that it can be supported on a metal oxide support material. Preferably, the second platinum group metal is one or more of Ru, Rh, Pd, Os, Ir and Pt. More preferably, the second platinum group metal is one or more of Rh, Pd and Pt, more preferably one or more of Pd and Pt, and more preferably Pd.

Further, there is in principle no particular restriction as to the loading of the second platinum group metal. Preferably, the loading of the second platinum group metal comprised in the second layer is in the range of from 5 to 50 $g/ft^3$, preferably of from 5 to 30 $g/ft^3$, more preferably of from 10 to 20 $g/ft^3$, more preferably of from 12 to 18 $g/ft^3$, and more preferably of from 14 to 16 $g/ft^3$.

With respect to the second metal oxide support material comprised in the second layer, any suitable metal oxide support material can be employed, provided that it can be used as a support for the second platinum group metal. Preferably, the second metal oxide support material is one or more of gamma-alumina, zirconia-alumina, silica-alumina, lanthana, lanthana-alumina, silica-zirconia-lanthana, alumina doped with manganese, alumina-zirconia-lanthana, titania, zirconia-titania, neodymia, praseodymia, ceria-zirconia, ceria-alumina, baria-ceria-alumina and ceria, preferably one or more of gamma-alumina, zirconia-alumina, silica-alumina, lanthana-alumina and ceria-alumina, more preferably one or more of gamma-alumina and silica-alumina, and more preferably silica-alumina.

There is in principle no particular restriction as to the loading of the second metal oxide support material comprised in the second layer. Preferably, the second metal oxide support material is comprised in the second layer at a loading in the range of from 0.2 to 2.5 $g/in^3$, preferably of from 0.5 to 2.0 $g/in^3$, more preferably of from 0.8 to 1.8 $g/in^3$, more preferably of from 1.2 to 1.6 $g/in^3$, and more preferably of from 1.3 to 1.5 $g/in^3$.

As regards the fifth platinum group metal comprised in the second layer, any suitable platinum group metal can be employed. Preferably, the fifth platinum group metal is one or more of Ru, Rh, Pd, Os, Ir and Pt. More preferably, the fifth platinum group metal is one or more of Rh, Pd and Pt, more preferably one or more of Pd and Pt, and more preferably Pt.

Further, there is in principle no particular restriction as to the loading of the fifth platinum group metal. Preferably, the loading of the fifth platinum group metal comprised in the second layer is in the range of from 30 to 60 $g/ft^3$, preferably of from 35 to 55 $g/ft^3$, more preferably of from 40 to 50 $g/ft^3$, more preferably of from 42 to 48 $g/ft^3$, and more preferably of from 44 to 46 $g/ft^3$.

As regards the third platinum group metal comprised in the third layer, any suitable platinum group metal can be employed, provided that it can be supported on a metal oxide support material. Preferably, the third platinum group metal is one or more of Ru, Rh, Pd, Os, Ir and Pt. More preferably, the third platinum group metal is one or more of Rh, Pd and Pt, more preferably one or more of Pd and Pt, and more preferably Pd.

Further, there is in principle no particular restriction as to the loading of the third platinum group metal. Preferably, the loading of the third platinum group metal comprised in the third layer is in the range of from 3 to 30 $g/ft^3$, preferably of from 5 to 25 $g/ft^3$, more preferably of from 10 to 20 $g/ft^3$, more preferably of from 12 to 18 $g/ft^3$, and more preferably of from 14 to 16 $g/ft^3$.

With respect to the third metal oxide support material comprised in the third layer, any suitable metal oxide support material can be employed, provided that it can be used as a support for the third platinum group metal. Preferably, the third metal oxide support material is one or more of gamma-alumina, zirconia-alumina, silica-alumina, lanthana, lanthana-alumina, silica-zirconia-lanthana, alumina doped with manganese, alumina-zirconia-lanthana, titania, zirconia-titania, neodymia, praseodymia, ceria-zirconia, ceria-alumina, baria-ceria-alumina and ceria, preferably one or more of gamma-alumina, silica-alumina, zirconia-alumina and alumina doped with manganese, and more preferably silica-alumina.

There is in principle no particular restriction as to the loading of the third metal oxide support material comprised in the third layer. Preferably, the third metal oxide support material is comprised in the third layer at a loading in the range of from 0.2 to 2.0 g/in$^3$, preferably of from 0.3 to 1.6 g/in$^3$, more preferably of from 0.5 to 1.3 g/in$^3$, more preferably of from 0.5 to 1.0 g/in$^3$, and more preferably of from 0.6 to 0.8 g/in$^3$.

As regards the sixth platinum group metal comprised in the third layer, any suitable platinum group metal can be employed. Preferably, the sixth platinum group metal is one or more of Ru, Rh, Pd, Os, Ir and Pt. More preferably, the sixth platinum group metal is one or more of Rh, Pd and Pt, more preferably one or more of Pd and Pt, and more preferably Pt.

Further, there is in principle no particular restriction as to the loading of the sixth platinum group metal. Preferably, the loading of the sixth platinum group metal comprised in the third layer is in the range of from 5 to 25 g/ft$^3$, more preferably of from 10 to 20 g/ft$^3$, more preferably of from 12 to 18 g/ft$^3$, and more preferably of from 14 to 16 g/ft$^3$.

It is particularly preferred that the third platinum group metal supported on the third metal oxide support material is Pd supported on silica-alumina. Further, it is preferred that the third platinum group metal supported on the third metal oxide support material is Pd supported on silica-alumina, and that the sixth platinum group metal is Pt.

Concerning the zeolitic material as such which is comprised in the third layer of the inventive diesel oxidation catalyst, no restrictions apply according to the present invention such that any conceivable zeolitic material may be contained therein.

According to the present invention, it is particularly preferred that the framework of the zeolitic material comprises a tetravalent element. It is particularly preferred according to the present invention that the zeolitic material comprises a tetravalent element Y which is one or more of Si, Sn, Ti, Zr and Ge, preferably Si. Further, it is preferred that the framework structure of the zeolitic material comprises a trivalent element X. It is particularly preferred according to the present invention that the zeolitic material comprises one or more of B, Al, Ga and In, preferably Al.

Furthermore, as regards the framework structure of the zeolitic material that is comprised in the third layer of the inventive diesel oxidation catalyst, again no particular restrictions apply such that the zeolitic material may have any framework structure type. Generally, it is conceivable that the framework structure type of the zeolitic material is one of type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MW, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, mixtures of two or more thereof, and mixed types of two or more thereof, preferably of the type AEI, GME, BEA, CHA, FAU, FER, HEU, LEV, MEI, MEL, MFI, or MOR, more preferably of the type AEI, GME, CHA, MFI, BEA, FAU, or MOR, more preferably of the type BEA, MFI, or CHA, more preferably of the type BEA and/or MFI, and more preferably of the type BEA.

With regard to the zeolitic material, it is preferred that it is in its calcined state. According to the present invention, the zeolitic material may comprise any further chemical elements, provided that these elements can establish one or more of the above defined framework type. However, it is preferred that the framework structure of the zeolitic material comprises Si, Al, O and H, and wherein at least 99.0 weight-%, preferably at least 99.5 weight-%, more preferably at least 99.9 weight-% of the framework structure of the zeolitic material consist of Si, Al, O and H.

Further, it is defined that the third layer comprises a zeolitic material comprising Fe. As regards the zeolitic material comprising Fe, no restriction applies on how the Fe is comprised in the zeolitic material. Thus, the Fe may be comprised in the zeolitic material as framework structure element or non-framework structure element. According to the present invention, it is preferred that the Fe is comprised in the zeolitic material as non-framework structure element.

Further, it is preferred that the framework structure of the zeolitic material comprises Si, Al, O, H and Fe, and wherein at least 99.0 weight-%, preferably at least 99.5 weight-%, more preferably at least 99.9 weight-% of the zeolitic material consist of Si, Al, O, H and Fe.

As regards the content of Fe in the zeolitic material comprising Fe, any suitable amount of Fe may be comprised in the zeolitic material. The zeolitic material comprises Fe, calculated as $Fe_2O_3$ in an amount in the range of from 0.5 to 6 weight-%, preferably of from 1.0 to 5.0 weight-%, more preferably of from 2.4 to 5.0 weight-%, more preferably of from 2.0 to 4.0 weight-%, more preferably of from 3 to 3.5 weight-%, and more preferably of from 1.5 to 2 weight-% based on the total weight of the zeolitic material.

It is particularly preferred that the zeolitic material comprising Fe is an iron-exchanged zeolitic material.

There is in principle no particular restriction as to the loading of the zeolitic material comprising Fe comprised in the third layer. Preferably, the zeolitic material comprising Fe is comprised in the third layer at a loading in the range of from 0.1 to 2.0 g/in$^3$, preferably of from 0.3 to 1.5 g/in$^3$, more preferably of from 0.4 to 1.1 g/in$^3$, more preferably of from 0.5 to 0.9 g/in$^3$, and more preferably of from 0.6 to 0.8 g/in$^3$.

With regard to the fourth layer, it is preferred that the fourth layer does not comprise a zeolitic material comprising Fe, preferably does not comprise a zeolitic material.

As regards the fourth platinum group metal comprised in the fourth layer, any suitable platinum group metal can be employed. Preferably, the fourth platinum group metal is one or more of Ru, Rh, Pd, Os, Ir and Pt. More preferably, the fourth platinum group metal is one or more of Rh, Pd and Pt, more preferably one or more of Pd and Pt, and more preferably Pt.

Further, there is in principle no particular restriction as to the loading of the fourth platinum group metal. Preferably, the loading of the fourth platinum group metal comprised in the fourth layer is in the range of from 10 to 100 g/ft$^3$, preferably of from 30 to 85 g/ft$^3$, more preferably of from 45 to 70 g/ft$^3$, more preferably of from 55 to 60 g/ft$^3$, and more preferably of from 56 to 58 g/ft$^3$.

With respect to the fourth metal oxide comprised in the fourth layer, any suitable metal oxide support material can be employed. Preferably, the fourth metal oxide is one or more of gamma-alumina, zirconia-alumina, silica-alumina, lanthana, lanthana-alumina, silica-zirconia-lanthana, alumina doped with manganese, alumina-zirconia-lanthana, titania, zirconia-titania, neodymia, praseodymia, ceria-zirconia, ceria-alumina, baria-ceria-alumina and ceria, preferably one or more of gamma-alumina, silica-alumina, zirconia-alumina and alumina doped with manganese, and more preferably alumina doped with manganese.

There is in principle no particular restriction as to the loading of the fourth metal oxide comprised in the fourth layer. Preferably, the fourth metal oxide is comprised in the fourth layer at a loading in the range of from 0.2 to 2.0 g/in$^3$, preferably of from 0.4 to 1.6 g/in$^3$, more preferably of from 0.5 to 1.3 g/in$^3$, more preferably of from 0.8 to 1.1 g/in$^3$, and more preferably of from 0.9 to 1.0 g/in$^3$.

The fourth layer may also comprise a zeolitic material comprising Fe. However, in the case wherein the fourth layer comprises a zeolitic material comprising Fe, it is preferred that the ratio of the weight of the zeolitic material comprising Fe in the third layer to the weight of the zeolitic material comprising Fe in the fourth layer is greater than 1.

According to a particular embodiment of the present invention, it is preferred that the washcoat consists of the first, the second, the third and the fourth layer, wherein at least one of the first, second, third and fourth layer is preferably as defined hereinabove. It is more preferred that the first, second, third and fourth layer are as defined herein. Further, it is particularly preferred that the diesel oxidation catalyst as defined herein consists of the substrate and the first, the second, the third and the fourth layer.

Thus, it is particularly preferred that the diesel oxidation catalyst according to the present invention consists of a substrate, preferably a cordierite, and a washcoat, wherein the washcoat comprises, preferably consists of, four layers, wherein the first layer comprises, preferably consisting of, palladium supported on ceria and on lanthana-alumina, the second layer comprises, preferably consisting of, platinum and palladium supported on silica-alumina, the third layer comprises, preferably consisting of, platinum and palladium supported on silica-alumina and a zeolitic material comprising Fe, and the fourth layer comprises, preferably consisting of, platinum and alumina doped with manganese.

Furthermore, it is preferred according to the present invention that the diesel oxidation catalyst according to any of the particular and preferred embodiments defined herein is used in a process for treating an exhaust gas, preferably for treating an exhaust gas from an internal combustion engine, more preferably for treating an exhaust gas from a diesel engine, more preferably for treating an exhaust gas from a lean-burn light-duty diesel engine. In this regard, it is preferred that the diesel oxidation catalyst id used for the oxidation of one or more of carbon monoxide, nitrogen monoxide and a hydrocarbon comprised in said exhaust gas, more preferably for the oxidation carbon monoxide, the oxidation of nitrogen monoxide and the oxidation of a hydrocarbon comprised in said exhaust gas.

Moreover, the present invention relates to the use of the diesel oxidation catalyst as defined herein for the oxidation of one or more of carbon monoxide, nitrogen monoxide and a hydrocarbon, preferably for the oxidation of carbon monoxide, nitrogen monoxide and a hydrocarbon, wherein the one or more of carbon monoxide, nitrogen monoxide and a hydrocarbon are preferably comprised in an exhaust gas, more preferably in an exhaust gas from a diesel engine, more preferably in an exhaust gas from a lean-burn light-duty diesel engine.

Moreover, the present invention relates to a method for the catalytic oxidation of one or more of carbon monoxide, nitrogen monoxide and a hydrocarbon, preferably for the oxidation of carbon monoxide, nitrogen monoxide and a hydrocarbon, wherein the one or more of carbon monoxide, nitrogen monoxide and a hydrocarbon are preferably comprised in an exhaust gas, more preferably in an exhaust gas from a diesel engine, more preferably in an exhaust gas from a lean-burn light-duty diesel engine, said method comprising employing the diesel oxidation catalyst according to any one of the particular and preferred embodiments defined herein as catalyst.

Further, the present invention relates to a method for the catalytic treatment of an exhaust gas, preferably for treating an exhaust gas from an internal combustion engine, more preferably for treating an exhaust gas from a diesel engine, more preferably for treating an exhaust gas from a lean-burn light-duty diesel engine, said method comprising employing the diesel oxidation catalyst according to any one of the particular and preferred embodiments defined herein as catalyst.

According to a particular preferred embodiment of the present invention, the diesel oxidation catalyst according to any of the particular and preferred embodiments defined herein is comprised in an exhaust gas treatment system which is preferably in fluid communication with an internal combustion engine, preferably a diesel engine, more preferably a lean-burn light-duty diesel engine.

Moreover, the present invention relates to an exhaust gas treatment system, preferably in fluid communication with an internal combustion engine, said exhaust gas system comprising the diesel oxidation catalyst described hereinabove and in any one of the particular and preferred embodiments defined in the present application, wherein the internal combustion engine is preferably a diesel engine, more preferably a lean-burn light-duty diesel engine. As regards the exhaust gas treatment system of the present invention, no particular restrictions apply as to any further components which may be comprised therein.

Preferably, the exhaust gas treatment system of the present invention comprises one or more components in addition to the diesel oxidation catalyst described hereinabove. More preferably, the exhaust gas treatment system comprises one or more of a catalyzed soot filter (CSF), a catalyst for selective catalytic reduction (SCR), a catalyst for selective catalytic reduction on filter (SCRoF), and a catalyst for selective catalytic reduction and for ammonia oxidation (SCR/AMOx). In particular, the exhaust gas system of the present invention comprises the diesel oxidation catalyst described hereinabove located upstream of a CSF which in turn is located upstream of a SCR, or comprises the diesel oxidation catalyst described hereinabove located upstream of a SCRoF which in turn is located upstream of a SCR/AMOx, or comprises the diesel oxidation catalyst described hereinabove located upstream of a SCRoF which in turn is located upstream of a SCR, or comprises the diesel oxidation catalyst described hereinabove located upstream of a SCRoF which in turn is located upstream of a SCR/AMOx.

Therefore, the present invention also relates to the exhaust gas treatment system above, comprising a catalyzed soot filter and a catalyst for selective catalytic reduction.

Moreover, the present invention relates to a process for preparing the catalyst of any of the particular and preferred embodiments defined in the present application, the process comprising (a) disposing a first slurry on a substrate, obtaining a slurry-treated substrate, wherein the first slurry comprises the first platinum group metal supported on the first metal oxide support material;

(b) drying the slurry-treated substrate obtained from (a), obtaining the substrate having a first layer disposed thereon;

(c) optionally calcining the dried slurry-treated substrate obtained from (b);

(d) disposing a second slurry on a substrate having a first layer disposed thereon, obtaining a slurry-treated substrate, wherein the second slurry comprises the second platinum group metal supported on the second metal oxide support material and comprises the fifth platinum group metal;

(e) drying the slurry-treated substrate obtained from (d), obtaining the substrate having a first and a second layer disposed thereon;

(f) optionally calcining the dried slurry-treated substrate obtained from (e);

(g) disposing, on x % of the length of the substrate from the front end of the substrate, a third slurry on the substrate having a first and a second layer disposed thereon obtained from (e), optionally obtained from (f), obtaining a slurry-treated substrate, obtaining the substrate having a first, a second and a third layer disposed thereon, wherein the third slurry comprises the third platinum group metal supported on the third metal oxide support material and comprises the zeolitic material comprising Fe and comprises the sixth platinum group metal;

(h) optionally drying the slurry-treated substrate obtained from (g);

(i) optionally calcining the dried slurry-treated substrate obtained from (h);

(j) disposing, on x % of the length of the substrate from the front end of the substrate, a fourth slurry on the substrate having a first, a second layer and a third layer disposed thereon obtained from (g), optionally obtained from (h) or (i), obtaining a slurry-treated substrate, wherein the fourth slurry comprises the fourth platinum group metal and the fourth metal oxide;

(k) drying the slurry-treated substrate obtained from (j);

(l) calcining the dried slurry-treated substrate obtained from (k), obtaining the substrate having a washcoat disposed thereon, said washcoat comprising the first, the second, the third and the fourth layer.

It is preferred that the first platinum group metal is Pd and that the process comprises mixing from 70 to 90 weight-%, preferably from 75 to 85 weight-%, more preferably 80 weight-% of the palladium as an aqueous solution, preferably as an aqueous palladium nitrate solution, with the first metal oxide support material, obtaining a platinum group metal-treated first metal oxide material;

milling said platinum group metal-treated first metal oxide material to a particle size D90, as determined according to reference example 1 herein, in the range of from 14 to 19 micrometer, preferably of from 15 to 18 micrometer, more preferably of 16 micrometer, obtaining a milled platinum group metal-treated first metal oxide material;

mixing the remaining amount of the palladium with the milled platinum group metal-treated first metal oxide material, obtaining a final platinum group metal-treated first metal oxide material; milling the final platinum group metal-treated first metal oxide material to a particle size D90, as determined according to reference example 1 herein, in the range of from 5 to 9 micrometer, preferably of from 6 to 8 micrometer, more preferably of 7 micrometer.

Further, it is preferred that the second platinum group metal comprises Pt and Pd, and that the process comprises adding a mixture of an aqueous palladium solution, preferably of an aqueous palladium nitrate solution, with the second metal oxide material to a colloidal platinum suspension, obtaining a platinum and palladium-treated second metal oxide material;

optionally adjusting the pH of the suspension to a value in the range of from 4 to 5, preferably of from 4.4 to 4.6, more preferably to 4.5;

milling the platinum and palladium-treated second metal oxide material to a particle size D90, as determined according to reference example 1 herein, in the range of from 14 to 18 micrometer, preferably of from 15 to 17 micrometer, more preferably of 16 micrometer.

Further, it is preferred that the third platinum group metal comprises Pt and Pd, and that the process comprises adding a mixture of an aqueous palladium solution, preferably an aqueous palladium nitrate solution, with the third metal oxide material to a colloidal platinum suspension, obtaining a platinum and palladium-treated third metal oxide material;

optionally adjusting the pH of the suspension to a value in the range of from 4 to 5, preferably of from 4.4 to 4.6, more preferably to 4.5;

milling the platinum and palladium-treated third metal oxide material to a particle size D90, as determined according to reference example 1 herein, in the range of from 18 to 22 micrometer, preferably of from 19 to 21 micrometer, more preferably of 20 micrometer, obtaining a milled platinum and palladium-treated third metal oxide material;

mixing the milled platinum and palladium-treated third metal oxide material with the zeolitic material comprising Fe.

As regards the first, the second, the third and the fourth slurry no particular restriction exists on their composition. However, it is preferred that one or more of the first, the second, the third and the fourth slurry comprises a liquid phase. There is no particular restriction in view of the liquid phase comprised in the one or more of the first, the second, the third and the fourth slurry. It is preferred that one or more of the first, the second, the third and the fourth slurry further comprises one or more of water, acetic acid and nitric acid, preferably water.

Furthermore, it is preferred that one or more the first, the second, the third and the fourth slurry further comprises a disposing adjuvant. Thus, there is no restriction as regards the chemical structure of the disposing adjuvant provided that the disposal adjuvant is suitable to aid the disposing of one or more of the first, the second, the third and the fourth slurry on the substrate. It is particularly preferred according to the present invention that the one or more of the first, the second, the third and the fourth slurry comprises tartaric acid as a disposing adjuvant.

As regards the drying in one or more of (b), (e), (h) and (k), no restrictions apply such that the drying may be effected in any suitable manner, provided that the slurry-treated substrate obtained from (a), (d), (g) and/or (j) is dried to some extent. It is preferred according to the present invention that a gas atmosphere is used for heat exchange to this effect. As regards the gas atmosphere for the drying in the one or more of (b), (e), (h) and (k), no particular restrictions apply such that any gas may be used, provided that the gas is suitable for providing a gas atmosphere at a temperature useful for heat exchange. Thus, by way of example, the gas atmosphere may comprise one or more of nitrogen, oxygen, an inert gas and carbon dioxide, preferably nitrogen. Alternatively, the gas atmosphere may comprise air.

As regards the temperature of the gas atmosphere for drying in one or more of (b), (e), (h) and (k), no particular restriction applies such that any suitable temperature may be chosen provided that the slurry-treated substrate obtained from (a), (d), (g) and/or (j) may be dried to a certain extent, resulting in a dried slurry-treated substrate. Thus, by way of example, drying in the one or more of (b), (e), (h) and (k), may be effected using a gas atmosphere having a temperature in the range of from 100 to 180° C. preferably of from 120 to 160° C., and more preferably of from 135 to 145° C.

As regards the calcining in one or more of (c), (f), (i) and (l), no restrictions apply such that the calcining may be effected in any suitable manner, provided that the dried slurry-treated substrate is calcined to some extent, and provided that the calcining results in a substrate having a first, second, third and/or fourth layer disposed thereon. However, it is preferred according to the present invention that a gas atmosphere is used for heat exchange to this effect. As regards the gas atmosphere for the calcining in the one or more of (c), (f), (i) and (l) the same applies as for the gas atmosphere for the drying, such that in principle any gas may be used, provided that the gas is suitable for providing a gas atmosphere at a temperature useful for calcining. Thus, by way of example, the gas atmosphere may comprise one or more of nitrogen, oxygen, an inert gas and carbon dioxide, preferably nitrogen.

As regards the temperature of the gas atmosphere for calcining in the one or more of (c), (f), (i) and (l) any suitable temperature may be chosen in principle, provided that the dried slurry-treated substrate obtained from one or more of (b), (e), (h) and/or (k) may be effectively calcined. Thus, by way of example, calcining in the one or more of (c), (f), (i) and (l) may be effected using a gas atmosphere having a temperature in the range of from 500 to 650° C., preferably of from 560 to 620° C., more preferably of from 580 to 600° C.

As regards the method for disposing one or more of the first slurry, the second slurry, the third slurry and the fourth slurry, no restriction applies such that any suitable method may be applied to this effect, provided that a slurry-treated substrate is obtained accordingly. However, it is preferred according to the present invention that disposing one or more of the first slurry, the second slurry, the third slurry and the fourth slurry is effected by wet impregnation or spraying, preferably by wet impregnation.

Furthermore, the present invention relates to a diesel oxidation catalyst, preferably the diesel oxidation catalyst according to any one of the particular and preferred embodiments defined herein, obtainable or obtained by a process as defined hereinabove.

As regards the alumina doped with manganese, the content of manganese comprised therein is calculated in weight-% as $MnO_2$. The term "alumina doped with manganese" used herein refers to alumina comprising manganese, calculated as $MnO_2$, in the range of from 5 to 10 weight-%, based on the weight of the alumina plus the weight of the manganese calculated as $MnO_2$.

As regards the value of the loading of the first, second, third, fourth, fifth and sixth platinum group metal expressed in grams per cubic feet, the loading of the first, second, and third metal oxide support material, the fourth metal oxide and the zeolitic material comprising Fe expressed in grams per cubic inch, it is noted that within the meaning of the present invention the weight in grams refers to the weight of the designated substance and the volume expressed in cubic inches and cubic feet, respectively, refers to the volume of the substrate and preferably of the uncoated substrate, wherein said volume includes any pores, cavities, and channels which may be present in the substrate form. In particularly preferred instances wherein a honeycomb monolith substrate is employed, the volume refers to the total volume of the honeycomb substrate including the channels contained therein.

The units inch (abbreviated as "in") and foot (abbreviated as "ft") as disclosed herein refer to units of length in the imperial and United States customary systems of measurements. There are 12 inches in a foot. One inch is equal to 2.54 cm.

The present invention is further illustrated by the following set of embodiments and combinations of embodiments resulting from the dependencies and back-references as indicated. In particular, it is noted that in each instance where a range of embodiments is mentioned, for example in the context of a term such as "The diesel oxidation catalyst of any one of embodiments 1 to 4", every embodiment in this range is meant to be explicitly disclosed for the skilled person, i.e. the wording of this term is to be understood by the skilled person as being synonymous to "The diesel oxidation catalyst of any one of embodiments 1, 2, 3, and 4".

1. A diesel oxidation catalyst (DOC), comprising a washcoat comprising four layers, the washcoat being disposed on a substrate, wherein the washcoat comprises a first layer comprising a first platinum group metal supported on a first metal oxide support material, which first layer is disposed on the substrate;
a second layer comprising a second platinum group metal supported on a second metal oxide support material, and comprising a fifth platinum group metal, which second layer is disposed on the first layer;
a third layer comprising a third platinum group metal supported on a third metal oxide support material and comprising a zeolitic material comprising Fe and comprising a sixth platinum group metal;
and a fourth layer comprising a fourth platinum group metal and a fourth metal oxide;
wherein the substrate has a length, a front end and a rear end;
wherein the first layer is disposed on the substrate on the entire length of the substrate,
wherein the second layer is disposed on the first layer on the entire length of the substrate;
wherein the third layer is at least partially disposed on the second layer on x % of the length of the substrate from the front end of the substrate;
wherein the fourth layer is at least partially disposed on the second layer on y % of the length of the substrate from the rear end of the substrate;
wherein x is in the range of from 30 to 70, y is in the range of from 30 to 70 and x+y is in the range of from 95 to 115.

2. The diesel oxidation catalyst of embodiment 1, wherein x is in the range of from 35 to 65, preferably in the range of from 40 to 60, more preferably in the range of from 45 to 55, more preferably in the range of from 49 to 51.

3. The diesel oxidation catalyst of embodiment 1 or 2, wherein x is 50.

4. The diesel oxidation catalyst of any one of embodiments 1 to 3, wherein y is in the range of from 35 to 65, preferably in the range of from 40 to 60, more preferably in the range of from 45 to 55, more preferably in the range of from 49 to 51.

5. The diesel oxidation catalyst of any one of embodiments 1 to 4, wherein y is 50.

6. The diesel oxidation catalyst of any one of embodiments 1 to 5, wherein x+y is in the range of from 96 to 110, preferably in the range of from 97 to 105, more preferably in the range of from 98 to 102, more preferably in the range of from 99 to 101.

7. The diesel oxidation catalyst of any one of embodiments 1 to 6, wherein x+y is 100.

8. The diesel oxidation catalyst of any one of embodiments 1 to 7, wherein the third layer is disposed on the second layer on x % of the length of the substrate from the front end of the substrate, and wherein the fourth layer is disposed on the second layer on y % of the length of the substrate from the rear end of the substrate, wherein x is 50, y is 50 and x+y is 100.

9. The diesel oxidation catalyst of any one of embodiments 1 to 8, wherein the substrate comprises a ceramic and/or a metallic substance, preferably a ceramic substance, more preferably a ceramic substance which is one or more of alumina, silica, silicates, alumino-silicates, aluminotitanates, silicon carbide, cordierite, mullite, zirconia, spinel, magnesia, and titania, more preferably one or more of alpha-alumina, aluminotitanates, silicon carbide, and cordierite, more preferably one or more of $Al_2TiO_5$, SiC, and cordierite, wherein more preferably the substrate comprises cordierite, wherein more preferably the substrate consists of cordierite.

10. The diesel oxidation catalyst of any one of embodiments 1 to 9, wherein the substrate is one or more of a granule, a pellet, a mesh, a ring, a sphere, a cylinder, a hollow cylinder and a monolith, wherein the substrate is preferably a monolith, more preferably a honey-comb monolith, wherein the honeycomb monolith is preferably a wall-flow or flow-through monolith, preferably a flow-through monolith.

11. The diesel oxidation catalyst of any one of embodiments 1 to 10, wherein the substrate has a plurality of longitudinally extending passages formed by longitudinally extending walls bounding and defining the passages and a longitudinal total length extending between the front end and the rear end of the substrate.

12. The diesel oxidation catalyst of any one of embodiments 1 to 11, wherein the first platinum group metal is one or more of Pt, Pd and Rh, preferably one or more of Pt and Pd, more preferably Pd.

13. The diesel oxidation catalyst of any one of embodiments 1 to 12, wherein the first layer comprises the first platinum group metal at a loading in the range of from 10 to 60 $g/ft^3$, preferably of from 20 to 40 $g/ft^3$, more preferably of from 26 to 36 $g/ft^3$, more preferably of from 28 to 34 $g/ft^3$, more preferably of from 30 to 32 $g/ft^3$.

14. The diesel oxidation catalyst of any one of embodiments 1 to 13, wherein the first metal oxide support material is one or more of gamma-alumina, zirconia-alumina, silica-alumina, lanthana, lanthana-alumina, silica-zirconia-lanthana, alumina doped with manganese, alumina-zirconia-lanthana, titania, zirconia-titania, neodymia, praseodymia, ceria-zirconia, ceria-alumina, baria-ceria-alumina and ceria, preferably one or more of gamma-alumina, lanthana-alumina, alumina-zirconia-lanthana, ceria-alumina and ceria, more preferably gamma-alumina, lanthana-alumina and ceria, more preferably one or more of lanthana-alumina and ceria, more preferably lanthana-alumina and ceria.

15. The diesel oxidation catalyst of any one of embodiments 1 to 14, wherein the first layer comprises the first metal oxide material at a loading in the range of from 0.2 to 2.5 $g/in^3$, preferably of from 0.5 to 2.0 $g/in^3$, more preferably of from 0.9 to 1.9 $g/in^3$, more preferably of from 1.2 to 1.8 $g/in^3$, more preferably of from 1.4 to 1.6 $g/in^3$.

16. The diesel oxidation catalyst of any one of embodiments 1 to 15, wherein the second platinum group metal is one or more of Pt, Pd and Rh, preferably one or more of Pt and Pd, more preferably Pd.

17. The diesel oxidation catalyst of any one of embodiments 1 to 16, wherein the second layer comprises the second platinum group metal at a loading in the range of from 5 to 50 $g/ft^3$, preferably of from 5 to 30 $g/ft^3$, more preferably of from 10 to 20 $g/ft^3$, more preferably of from 12 to 18 $g/ft^3$, more preferably of from 14 to 16 $g/ft^3$.

18. The diesel oxidation catalyst of any one of embodiments 1 to 17, wherein the second metal oxide support material is one or more of gamma-alumina, zirconia-alumina, silica-alumina, lanthana, lanthana-alumina, silica-zirconia-lanthana, alumina doped with manganese, alumina-zirconia-lanthana, titania, zirconia-titania, neodymia, praseodymia, ceria-zirconia, ceria-alumina, baria-ceria-alumina and ceria, preferably one or more of gamma-alumina, zirconia-alumina, silica-alumina, lanthana-alumina and ceria-alumina, more preferably one or more of gamma-alumina and silica-alumina, more preferably silica-alumina.

19. The diesel oxidation catalyst of any one of embodiments 1 to 18, wherein the second layer comprises the second metal oxide support material at a loading in the range of from 0.2 to 2.5 $g/in^3$, preferably of from 0.5 to 2.0 $g/in^3$, more preferably of from 0.8 to 1.8 $g/in^3$, more preferably of from 1.2 to 1.6 $g/in^3$, more preferably of from 1.3 to 1.5 $g/in^3$.

20. The diesel oxidation catalyst of any one of embodiments 1 to 19, wherein the fifth platinum group metal is one or more of Pt, Pd and Rh, preferably one or more of Pt and Pd, more preferably Pt.

21. The diesel oxidation catalyst of any one of embodiments 1 to 20, wherein the second layer comprises the fifth platinum group metal at a loading in the range of from 30 to 60 $g/ft^3$, preferably of from 35 to 55 $g/ft^3$, more preferably of from 40 to 50 $g/ft^3$, more preferably of from 42 to 48 $g/ft^3$, more preferably of from 44 to 46 $g/ft^3$.

22. The diesel oxidation catalyst of any one of embodiments 1 to 21, wherein the third platinum group metal is one or more of Pt, Pd and Rh, preferably one or more of Pt and Pd, more preferably Pd.

23. The diesel oxidation catalyst of any one of embodiments 1 to 22, wherein the third layer comprises the third platinum group metal at a loading in the range of from 3 to 30 $g/ft^3$, preferably of from 5 to 25 $g/ft^3$, more preferably of from 10 to 20 $g/ft^3$, more preferably of from 12 to 18 $g/ft^3$, more preferably of from 14 to 16 $g/ft^3$.

24. The diesel oxidation catalyst of any one of embodiments 1 to 23, wherein the third metal oxide support material is one or more of gamma-alumina, zirconia-alumina, silica-alumina, lanthana, lanthana-alumina, silica-zirconia-lanthana, alumina doped with manganese, alumina-zirconia-lanthana, titania, zirconia-titania, neodymia, praseodymia, ceria-zirconia, ceria-alumina, baria-ceria-alumina and ceria, preferably one or more of gamma-alumina, silica-alumina, zirconia-alumina and alumina doped with manganese, more preferably silica-alumina.

25. The diesel oxidation catalyst of any one of embodiments 1 to 24, wherein the third layer comprises the third metal oxide material at a loading in the range of from 0.2 to 2.0 g/in$^3$, preferably of from 0.3 to 1.6 g/in$^3$, more preferably of from 0.5 to 1.3 g/in$^3$, more preferably of from 0.5 to 1.0 g/in$^3$, more preferably of from 0.6 to 0.8 g/in$^3$.

26. The diesel oxidation catalyst of any one of embodiments 1 to 25, wherein the sixth platinum group metal is one or more of Pt, Pd and Rh, preferably one or more of Pt and Pd, more preferably Pt.

27. The diesel oxidation catalyst of any one of embodiments 1 to 26, wherein the third layer comprises the sixth platinum group metal at a loading in the range of from 3 to 30 g/ft$^3$, preferably of from 5 to 25 g/ft$^3$, more preferably of from 10 to 20 g/ft$^3$, more preferably of from 12 to 18 g/ft$^3$, more preferably of from 14 to 16 g/ft$^3$.

28. The diesel oxidation catalyst of any one of embodiments 1 to 27, wherein the framework structure of the zeolitic material comprises a tetravalent element Y which is one or more of Si, Sn, Ti, Zr and Ge, preferably Si.

29. The diesel oxidation catalyst of any one of embodiments 1 to 28, wherein the framework structure of the zeolitic material comprises a trivalent element X which is one or more of B, Al, Ga and In, preferably Al.

30. The diesel oxidation catalyst of any one of embodiments 1 to 29, wherein the zeolitic material has a framework structure of the type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MW, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, mixtures of two or more thereof, and mixed types of two or more thereof, preferably of the type AEI, GME, BEA, CHA, FAU, FER, HEU, LEV, MEI, MEL, MFI, or MOR, more preferably of the type AEI, GME, CHA, MFI, BEA, FAU, or MOR, more preferably of the type BEA, MFI, or CHA, more preferably of the type BEA and/or MFI, and more preferably of the type BEA.

31. The diesel oxidation catalyst of any one of embodiments 1 to 30, wherein the framework structure of the zeolitic material comprises Si, Al, O and H, and wherein at least 99.0 weight-%, preferably at least 99.5 weight-%, more preferably at least 99.9 weight-% of the framework structure of the zeolitic material consist of Si, Al, O and H.

32. The diesel oxidation catalyst of any one of embodiments 1 to 31, wherein the zeolitic material comprises Si, Al, O, H and Fe, and wherein at least 99.0 weight-%, preferably at least 99.5 weight-%, more preferably at least 99.9 weight-% of the zeolitic material consist of Si, Al, O, H and Fe.

33. The diesel oxidation catalyst of any one of embodiments 1 to 32, wherein the zeolitic material comprises Fe, calculated as $Fe_2O_3$, in an amount in the range of from 0.5 to 6 weight-%, preferably of from 1.0 to 5.0 weight-%, more preferably of from 2.4 to 5.0 weight-%, more preferably of from 2.0 to 4.0 weight-%, more preferably of from 3 to 3.5 weight-%, more preferably of from 1.5 to 2 weight-% based on the total weight of the zeolitic material.

34. The diesel oxidation catalyst of any one of embodiments 1 to 33, wherein the zeolitic material is an iron-exchanged zeolitic material.

35. The diesel oxidation catalyst of any one of embodiments 1 to 34, wherein the third layer comprises the zeolitic material at a loading in the range of from 0.1 to 2.0 g/in$^3$, preferably of from 0.3 to 1.5 g/in$^3$, more preferably of from 0.4 to 1.1 g/in$^3$, more preferably of from 0.5 to 0.9 g/in$^3$, more preferably of from 0.6 to 0.8 g/in$^3$.

36. The diesel oxidation catalyst of any one of embodiments 1 to 35, wherein the fourth layer does not comprise a zeolitic material comprising Fe, preferably does not comprise a zeolitic material.

37. The diesel oxidation catalyst of any one of embodiments 1 to 36, wherein the fourth platinum group metal is one or more of Pt, Pd and Rh, preferably one or more of Pt and Pd, more preferably Pt.

38. The diesel oxidation catalyst of any one of embodiments 1 to 37, wherein the fourth layer comprises the fourth platinum group metal at a loading in the range of from 10 to 100 g/ft$^3$, preferably of from 30 to 85 g/ft$^3$, more preferably of from 45 to 70 g/ft$^3$, more preferably of from 55 to 60 g/ft$^3$, more preferably of from 56 to 58 g/ft$^3$.

39. The diesel oxidation catalyst of any one of embodiments 1 to 38, wherein the fourth metal oxide is one or more of gamma-alumina, zirconia-alumina, silica-alumina, lanthana, lanthana-alumina, silica-zirconia-lanthana, alumina doped with manganese, alumina-zirconia-lanthana, titania, zirconia-titania, neodymia, praseodymia, ceria-zirconia, ceria-alumina, baria-ceria-alumina and ceria, preferably one or more of gamma-alumina, silica-alumina, zirconia-alumina and alumina doped with manganese, more preferably alumina doped with manganese.

40. The diesel oxidation catalyst of any one of embodiments 1 to 39, wherein the fourth layer comprises the fourth metal oxide at a loading in the range of from 0.2 to 2.0 g/in$^3$, preferably of from 0.4 to 1.6 g/in$^3$, more preferably of from 0.5 to 1.3 g/in$^3$, more preferably of from 0.8 to 1.1 g/in$^3$, more preferably of from 0.9 to 1.0 g/in$^3$.

41. The diesel oxidation catalyst of any one of embodiments 1 to 40, wherein the washcoat consists of the first, the second, the third and the fourth layer.

42. The diesel oxidation catalyst of any one of embodiments 1 to 41 consisting of the substrate and the first, the second, the third and the fourth layer.

43. The diesel oxidation catalyst according to any one of embodiments 1 to 42 for use as a catalyst in a process for treating an exhaust gas, preferably for treating an exhaust gas from an internal combustion engine, more preferably for treating an exhaust gas from a diesel engine, more preferably for treating an exhaust gas from a lean-burn light-duty diesel engine, preferably for the oxidation of one or more of carbon monoxide, nitrogen monoxide and a hydrocarbon comprised in said exhaust gas, more preferably for the oxidation carbon monoxide, the oxidation of nitrogen monoxide and the oxidation of a hydrocarbon comprised in said exhaust gas.

44. Use of the diesel oxidation catalyst according to any one of embodiments 1 to 42 for the oxidation of one or more of carbon monoxide, nitrogen monoxide and a hydrocarbon, preferably for the oxidation of carbon monoxide, nitrogen monoxide and a hydrocarbon, wherein the one or more of carbon monoxide, nitrogen monoxide and a hydrocarbon are preferably comprised in an exhaust gas, more preferably in an exhaust gas from a diesel engine, more preferably in an exhaust gas from a lean-burn light-duty diesel engine.

45. A method for the catalytic oxidation of one or more of carbon monoxide, nitrogen monoxide and a hydrocarbon, preferably for the oxidation of carbon monoxide, nitrogen monoxide and a hydrocarbon, wherein the one or more of carbon monoxide, nitrogen monoxide and a hydrocarbon are preferably comprised in an exhaust gas, more preferably in an exhaust gas from a diesel engine, more preferably in an exhaust gas from a lean-burn light-duty diesel engine, said method comprising employing the diesel oxidation catalyst according to any one of embodiments 1 to 42 as oxidation catalyst.

46. A method for the catalytic treatment of an exhaust gas, preferably for treating an exhaust gas from an internal combustion engine, more preferably for treating an exhaust gas from a diesel engine, more preferably for treating an exhaust gas from a lean-burn light-duty diesel engine, said method comprising employing the diesel oxidation catalyst according to any one of embodiments 1 to 42 as catalyst.

47. The diesel oxidation catalyst of any one of embodiments 1 to 42, wherein the catalyst is comprised in an exhaust gas treatment system which is preferably in fluid communication with an internal combustion engine, preferably a diesel engine, more preferably a lean-burn light-duty diesel engine.

48. An exhaust gas treatment system, preferably in fluid communication with an internal combustion engine, said exhaust gas system comprising the diesel oxidation catalyst of any one of embodiments 1 to 42, wherein the internal combustion engine is preferably a diesel engine, more preferably a lean-burn light-duty diesel engine.

49. The exhaust gas treatment system of embodiment 48, additionally comprising one or more of a catalyzed soot filter, a catalyst for selective catalytic reduction, a catalyst for selective catalytic reduction on filter (SCRoF) and a catalyst for selective catalytic reduction and for ammonia oxidation.

50. A process for preparing a diesel oxidation catalyst of any one of embodiments 1 to 42, comprising
(a) disposing a first slurry on a substrate, obtaining a slurry-treated substrate, wherein the first slurry comprises the first platinum group metal supported on the first metal oxide support material;
(b) drying the slurry-treated substrate obtained from (a), obtaining the substrate having a first layer disposed thereon;
(c) optionally calcining the dried slurry-treated substrate obtained from (b);
(d) disposing a second slurry on a substrate having a first layer disposed thereon, obtaining a slurry-treated substrate, wherein the second slurry comprises the second platinum group metal supported on the second metal oxide support material and comprises the fifth platinum group metal;
(e) drying the slurry-treated substrate obtained from (d), obtaining the substrate having a first and a second layer disposed thereon;
(f) optionally calcining the dried slurry-treated substrate obtained from (e);
(g) disposing, on x % of the length of the substrate from the front end of the substrate, a third slurry on the substrate having a first and a second layer disposed thereon obtained from (e), optionally obtained from (f), obtaining a slurry-treated substrate, obtaining the substrate having a first, a second and a third layer disposed thereon, wherein the third slurry comprises the third platinum group metal supported on the third metal oxide support material and comprises the zeolitic material comprising Fe and comprises the sixth platinum group metal;
(h) optionally drying the slurry-treated substrate obtained from (g);
(i) optionally calcining the dried slurry-treated substrate obtained from (h);
(j) disposing, on x % of the length of the substrate from the front end of the substrate, a fourth slurry on the substrate having a first, a second layer and a third layer disposed thereon obtained from (g), optionally obtained from (h) or (i), obtaining a slurry-treated substrate, wherein the fourth slurry comprises the fourth platinum group metal and the fourth metal oxide;
(k) drying the slurry-treated substrate obtained from (j);
(l) calcining the dried slurry-treated substrate obtained from (k), obtaining the substrate having a washcoat disposed thereon, said washcoat comprising the first, the second, the third and the fourth layer.

51. The process of embodiment 50, wherein the first platinum group metal is Pd, the process comprising
mixing from 70 to 90 weight-%, preferably from 75 to 85 weight-%, more preferably 80 weight-% of the palladium as an aqueous solution, preferably as an aqueous palladium nitrate solution, with the first metal oxide support material, obtaining a platinum group metal-treated first metal oxide material;
milling said platinum group metal-treated first metal oxide material to a particle size D90, as determined according to reference example 1 herein, in the range of from 14 to 19 micrometer, preferably of from 15 to 18 micrometer, more preferably of 16 micrometer, obtaining a milled platinum group metal-treated first metal oxide material;
mixing the remaining amount of the palladium with the milled platinum group metal-treated first metal oxide material, obtaining a final platinum group metal-treated first metal oxide material;
milling the final platinum group metal-treated first metal oxide material to a particle size D90, as determined according to reference example 1 herein, in the range of from 5 to 9 micrometer, preferably of from 6 to 8 micrometer, more preferably of 7 micrometer.

52. The process of embodiment 50 or 51, wherein the second platinum group metal comprises Pt and Pd, the process comprising adding a mixture of an aqueous palladium solution, preferably of an aqueous palladium nitrate solution, with the second metal oxide material to a colloidal platinum suspension, obtaining a platinum and palladium-treated second metal oxide material;
optionally adjusting the pH of the suspension to a value in the range of from 4 to 5, preferably of from 4.4 to 4.6, more preferably to 4.5;
milling the platinum and palladium-treated second metal oxide material to a particle size D90, as determined according to reference example 1 herein, in the range of from 14 to 18 micrometer, preferably of from 15 to 17 micrometer, more preferably of 16 micrometer.

53. The process of any one of embodiments 50 to 52, wherein the third platinum group metal comprises Pt and Pd, the process comprising adding a mixture of an aqueous palladium solution, preferably an aqueous palladium nitrate solution, with the third metal oxide material to a colloidal platinum suspension, obtaining a platinum and palladium-treated third metal oxide material;

optionally adjusting the pH of the suspension to a value in the range of from 4 to 5, preferably of from 4.4 to 4.6, more preferably to 4.5;

milling the platinum and palladium-treated third metal oxide material to a particle size D90, as determined according to reference example 1 herein, in the range of from 18 to 22 micrometer, preferably of from 19 to 21 micrometer, more preferably of 20 micrometer, obtaining a milled platinum and palladium-treated third metal oxide material;

mixing the milled platinum and palladium-treated third metal oxide material with the zeolitic material comprising Fe.

54. The process of any one of embodiments 50 to 53, wherein one or more of the first slurry the second slurry, the third slurry and the fourth slurry further comprise one or more of water, acetic acid and nitric acid, preferably water.

55. The process of any one of embodiments 50 to 54, wherein one or more of the first slurry, the second slurry, the third slurry and the fourth slurry further comprise a disposing adjuvant, preferably tartaric acid.

56. The process of any one of embodiments 50 to 55, wherein the drying according to one or more of (b), (e), (h) and (k) is effected using a gas atmosphere having a temperature in the range of from 100 to 180° C. preferably of from 120 to 160° C., and more preferably of from 135 to 145° C.

57. The process of any one of embodiments 50 to 56, wherein the calcining according to one or more of (c), (f), (i) and (l) is effected using a gas atmosphere having a temperature in the range of from 500 to 650° C., preferably of from 560 to 620° C., more preferably of from 580 to 600° C.

58. The process of any one of embodiments 50 to 57, comprising disposing one or more of the first slurry, the second slurry, the third slurry and the fourth slurry by wet impregnation or spraying, preferably by wet impregnation.

59. A diesel oxidation catalyst, preferably the diesel oxidation catalyst according to any one of embodiments 1 to 42, obtainable or obtained or preparable or prepared by a process according to any one of embodiments 50 to 58.

The present invention is further illustrated by the following examples, comparative examples, and reference examples.

EXAMPLES

Reference Example 1: Determination of the D90 Values

The D90 particle size as referred to in the context of the present invention was measured with a Sympatec Particle Size instrument using laser diffraction (Sympatec's Quixel Helas/R having a high focus lens laser source and a multi-element photodetector). According to this method, the particle size distribution was evaluated with a parameter-free and model-independent mathematical algorithm, accomplished by the introduction of the Phillips-Twomey algorithm for the inversion process®.

Comparative Example 1: Catalyst A: 2-Layer Structure without Ceria

For the first layer (bottom layer), 1.60 g/in$^3$ of silica-alumina (Siralox® 5/180, high porous alumina stabilized with 5 weight-% silica, Sasol) was impregnated with an aqueous solution of palladium nitrate yielding a final dry Pd content of 27 g/ft$^3$. The resulting mixture was dispersed in water. An aqueous solution containing the Pt precursor as an ammine stabilized hydroxo Pt(IV) complex (Pt content between 10 and 20 weight-%) was used to impregnate the metal onto the Pd-containing silica-alumina slurry producing a final dry Pt content of 67.5 g/ft$^3$. Accordingly, the Pd/Pt ratio was 2.5:1. After initial pH adjustment with nitric acid and tartaric acid to a pH of 4.1, the slurry was milled until the resulting D90 particle size determined as described in Reference Example 1 herein was 16 micrometer. Then, the pH was finally adjusted to 4.1. Subsequently, the slurry was disposed on a monolith (cordierite, 5.66"×3" cylindrically shaped substrate with 400 cells per square inch and 4 mil wall thickness, from NGK) giving a first layer. The resulting monolith was dried at 140° C. in air.

The second layer (top layer) comprised 0.60 g/in$^3$ of silica-alumina (Siralox® 5/180, high porous alumina stabilized with 5 weight-% silica, from Sasol) onto which an aqueous solution of platinum as an ammine stabilized hydroxo Pt(IV) complex (Pt content between 10 and 20 weight-%) was impregnated yielding a final dry Pt content of 40 g/ft$^3$. The resulting mixture was dispersed in water. After initial pH adjustment (using nitric acid and/or tartaric acid) to 4.1, the slurry was milled until the resulting D90 particle size determined as described in Reference Example 1 herein was 15 micrometer. The pre-milled, Pt-containing slurry was mixed with 0.5 g/in$^3$ of zeolite beta (H-form of zeolite beta, silica-to-alumina ratio (SAR)=26; obtained from Zeolyst International under commercial name CP-7119). Then, water was added and the slurry was mixed. After final pH adjustment to 4.0 (using nitric acid and/or tartaric acid), the slurry had a total solid content of 38%. The slurry was subsequently disposed onto the first layer. The resulting monolith was dried at 140° C. and calcined at 590° C. in air.

Comparative Example 2: Catalyst B: 3-Layer Structure with Ceria

For the first layer (bottom layer), a palladium nitrate solution was added dropwise to a 1.0 g/in$^3$ of a high porous gamma-alumina that contained 50 weight-% ceria, obtained from NEO Chemicals & Oxides (Europe) Ltd under commercial name Ce-Al-50-50. Accordingly, the total ceria content in this washcoat was 0.5 g/in$^3$. The resulting material contained 3.8 weight-% Pd on ceria. The mixture was dispersed in water and acid (e.g. acetic acid). Then, the pH was adjusted with nitric acid to 5.3, then 0.1 g/in$^3$ of another high porosity alumina (obtained from Sasol Germany GmbH under commercial name Puralox® SBA 150/L4) was added and the resulting slurry was mixed. After pH adjustment to 4.7, the slurry was milled until the resulting D90 particle size determined as described in Reference Example 1 herein was 20 micrometer. The total Pd content of the slurry was 33.34 g/ft$^3$ with a solid content of 36%. The slurry was disposed onto a monolith followed by drying at 140° C. in air.

For the second layer (middle layer), 0.85 g/in$^3$ of silica-alumina (Siralox® 5/180, high porous alumina stabilized with 5 weight-% silica, Sasol) was impregnated using an aqueous solution of palladium nitrate producing a final dry Pd content of 10.83 g/ft$^3$. The resulting mixture was dispersed in water. An aqueous solution of platinum as an ammine stabilized hydroxo Pt(IV) complex (Pt content between 10 and 20 weight-%) was used as Pt-precursor, which was added to the Pd-containing slurry producing a final dry Pt content of 20.83 g/ft$^3$. Accordingly, the Pt/Pd ratio was 1.9/1. After pH adjustment with nitric acid and tartaric acid to 4.1, the slurry was milled until the resulting D90 particle size determined as described in Reference Example 1 herein was 16 micrometer and subsequently disposed onto the first layer. The resulting monolith was then dried at 140° C. in air.

The third layer (top layer) was composed of 1.30 g/in$^3$ of an alumina doped with manganese (high porous alumina doped with 5 weight-% manganese; Puralox® TM 100/150 Mn5). from Sasol), calculated as MnO$_2$, onto which an aqueous solution of platinum as an ammine stabilized hydroxo Pt(IV) complex (Pt content between 10 and 20 weight-%) was impregnated yielding a final dry Pt content of 65 g/ft$^3$. The resulting mixture was dispersed in water. After pH adjustment using nitric and/or tartaric acids to 4.3, the slurry was milled until the resulting D90 particle size determined as described in Reference Example 1 herein was 20 micrometer. The premilled, Pt-containing slurry was mixed with 0.5 g/in$^3$ of zeolite beta (H-form of zeolite beta, silica-to-alumina ratio (SAR)=26; obtained from Zeolyst International under commercial name CP-7119). After addition of water, the slurry was mixed and then milled until the resulting D90 particle size determined as described in Reference Example 1 herein was 17 micrometer. The pH was re-adjusted to 4.3, the total solid content of the slurry was 38 weight-%. The slurry was subsequently disposed onto the second layer. The resulting monolith was dried at 140° C. and calcined at 590° C. in air.

Example: Catalyst C: 4-Layer Structure with Ceria

For the first layer (bottom layer), a palladium nitrate solution (80 weight-% of total Pd) was added to a mixture of 0.75 g/in$^3$ lanthana-alumina (Puralox® SBA 150/L4, high porous gamma-alumina doped with 4 weight-% lanthana, Sasol) and 0.75 g/in$^3$ ceria. The resulting material contained 2.0 weight-% Pd on ceria. The mixture was dispersed in water and acid (e.g. acetic acid) and milled to a particle size d$_{90}$ of 15 micrometer. The remaining (20 weight-%) palladium nitrate solution was added to the pre-milled slurry, dispersed with more acid (acetic acid and tartaric acid) and milled until the resulting D90 particle size determined as described in Reference Example 1 herein was 7 micrometer. The final slurry was composed of 2.4 weight-% Pd on ceria and 31.3 g/ft$^3$ total Pd loading. The slurry containing all components mentioned above was disposed onto a monolith. The resulting monolith was dried at 140° C. air.

For the second layer (middle layer), 1.4 g/in$^3$ of silica-alumina (Siralox® 5/180, high porous alumina stabilized with 5 weight-% silica, Sasol) was impregnated with an aqueous solution of palladium nitrate yielding a final dry Pd content of 15 g/ft$^3$. The resulting mixture was dispersed in water. A colloidal platinum suspension (Pt particles in water with 2 weight-% Pt, the particles falling in the particle size range of from 1 to 3 nm) was stirred in a container to disperse the platinum particles. The dispersed Pd-containing silica-alumina was slowly added to the Pt suspension under constant stirring, producing a dry content of Pt of 45 g/ft$^3$ and a Pt:Pd ratio of 3:1. After pH adjustment with nitric and tartaric acid to 4.5, the slurry was milled until the resulting D90 particle size determined as described in Reference Example 1 herein was 16 micrometer. The slurry is subsequently disposed onto the first layer. The resulting monolith was dried at 140° C. in air.

For the third layer (top inlet layer), 0.70 g/in$^3$ of a silica-alumina (Siralox® 5/180, high porous alumina stabilized with 5 weight-% silica, from Sasol) was impregnated with an aqueous solution of palladium nitrate yielding a final dry Pd content of 15.2 g/ft$^3$. The resulting mixture was dispersed in water. Separately, a colloidal platinum suspension (Pt particles in water with 2 weight-% Pt, the particles falling in the range of from 1 to 3 nm) was stirred in a container to disperse the platinum particles. The dispersed Pd-containing silica-alumina was slowly added to the Pt suspension under constant stirring, producing a dry content of Pt of 15.2 g/ft$^3$ yielding a total Pt:Pd ratio of 1:1. After pH adjustment using nitric acid and/or tartaric acid to 4.5, the slurry was milled until the resulting D90 particle size determined as described in Reference Example 1 herein was 20 micrometer. The pre-milled, precious metal containing slurry was mixed with 0.7 g/in$^3$ of a zeolitic material having the framework structure type BEA comprising Fe (CP-7124, zeolite beta containing 1.5 weight-% Fe, calculated as Fe$_2$O$_3$, SAR=26, obtained from Zeolyst International). After addition of water, the slurry was further mixed. After pH adjustment to 4.3 using nitric acid and/or tartaric acid, the total solid content was fixed to 35 weight-%. The slurry was subsequently disposed from the inlet side onto the second layer on 50% of the length of the monolith.

For the fourth layer (top outlet layer), a Pt-only slurry was prepared containing 57 g/ft$^3$ colloidal Pt and 1 g/in$^3$ alumina doped with 5 weight-% manganese, calculated as MnO$_2$ (high porous alumina doped with 5 weight-% manganese; Puralox® TM 100/150 Mn5). The slurry was disposed on 50% of the length of the substrate from the outlet side. Subsequently, the resulting monolith was dried at 140° C. in air and then calcined at 590° C. in air.

Example D: Catalyst Performance Evaluation

Sample Preparation

Oven aging was done in an oven equipped with several gas lines for simultaneous dosage of two or more gases. Catalysts A, B and C were aged together in the above mentioned oven at 800° C. (10% O$_2$ and 10% water steam) for 16 hours. The ramp up phase to the aging temperature of 800° C. lasted 4 hours, the catalysts were maintained at 800° C. for 16 hours. The oven door was opened to allow for a sudden and rapid cool down of the catalysts.

Testing

The catalysts having a comparable content of platinum group metal were then tested. An engine bench evaluation was performed on a transient engine test cell in the Hanover Engine Lab (HEL). The bench was equipped with a 4-cylinder Euro 6 light-duty diesel engine with 1.6 l engine displacement. For emission measurements, a 3 line system AVL AMA 400 was used. In addition, a FTIR Amluk/MKS system was available for SO$_x$ and NO$_x$ detection. For light-off evaluation (steady state), each catalyst was suitably canned and placed downstream in the exhaust line of the 4 cylinder light duty diesel engine with 1.6 l engine displacement. The light-off entailed separate protocols for CO/HC and NO oxidation evaluation. For CO and HC, the engine is operated in the exhaust gas recycling mode (EGR) in order to produce large emissions of CO and HC gases, while the NO light-off was performed without the EGR mode to enhance high engine NOx emissions. Typical concentrations in the exhaust stream (engine emissions) were constant at 1200 ppm of CO, 99 ppm of HC and 110 ppm of $NO_x$ for CO/HC light-off and 315 ppm of CO, 50 ppm of HC and 700 ppm of $NO_x$ for NO light-off. Temperature ramps of 3 to 4° C./min were employed in both procedures. The catalysts were sulfated using either a 6 cylinder engine with 3 l engine displacement by combusting high sulfur fuel (350 ppm) over the catalysts at 300 to 350° C., or with direct injection of gaseous $SO_2$ in the exhaust line of a 4 cylinder engine with 2 l engine displacement. Desulfation was achieved by: (1) either placing a burner (with fuel injection) diesel oxidation catalyst upstream of the sulfated catalysts to produce the desired desulfation temperature that can be used downstream or (2) by creating the exotherm on the sulfated catalysts themselves using a well-defined engine operation mode. Both sulfation/desulfation methods were applied in this study and the amount of $SO_2$ released by sulfated catalysts did not depend to any extent on the method used.

Results

CO Oxidation—Comparison of Comparative Examples A and B with Inventive Example C Inventive Example C shows higher CO conversions at lower temperatures, in particular in the temperature range of from 120 to 180° C., compared to Comparative Examples A and B. The respective light-off curves of CO for oven-aged Comparative Examples A and B as well as for oven aged Inventive Example C are shown in FIG. 1.

HC Oxidation—Comparison of Comparative Examples A and B with Inventive Example C Inventive Example C shows a higher hydrocarbon oxidation efficiency at lower temperatures, especially in the temperature range of from 120 to 200° C., than Comparative Examples A and B. Thus, the HC light-off performance of Inventive Example C is significantly better. The respective light-off curves of HC for oven-aged Comparative Examples A and B as well as for oven aged Inventive Example C are shown in FIG. 2.

NO Oxidation—Comparison of Comparative Examples A and B with Inventive Example C Inventive Example C shows a higher NO oxidation at lower temperatures, in particular in the temperature range of from 150 to 200° C. than Comparative Examples A and B. The respective light-off curves of NO for oven-aged Comparative Examples A and B as well as for oven aged Inventive Example C are shown in FIG. 3 wherein the ratio $NO_2/NO_x$ is shown on the ordinate.

CO Oxidation—Sulfation Sensitivity of Comparative Example A vs. Inventive Example C Inventive Example C shows higher sensitivity to sulfur than Comparative Example A. However, it can be seen in FIG. 4 showing the CO light-off curves for oven-aged, sulfated and de-sulfated Comparative Example A and Inventive Example C that Inventive Example C recovers from sulfation. It can be further taken from FIG. 4 that Inventive Example C shows higher CO oxidation efficiency than Comparative Example A at lower temperatures, in particular in the temperature range of from 120 to 180° C. for all states (i.e. oven-aged, sulfated, de-sulfated).

HC Oxidation—Sulfation Sensitivity of Comparative Example A vs. Inventive Example C FIG. 5 shows the HC light-off curves for oven-aged, sulfated and de-sulfated Comparative Example A and Inventive Example C. It can be seen that Inventive Example C shows a higher HC oxidation efficiency than Comparative Example A at lower temperatures, in particular in the temperature range of from 120 to 200° C. Further, it can be seen that Inventive Example C recovers from sulfation.

CO Oxidation—Sulfation Sensitivity of Comparative Example B vs. Inventive Example C The CO light-off curves for oven-aged, sulfated and de-sulfated Comparative Example B and Inventive Example C are shown in FIG. 6. Both Examples show a significant sensitivity to sulfur. However, Inventive Example C recovers to oven-aged values whereas Comparative Example B does not recover.

HC Oxidation—Sulfation Sensitivity of Comparative Example B vs. Inventive Example C The HC light-off curves for oven-aged, sulfated and de-sulfated Comparative Example B and Inventive Example C are shown in FIG. 7. It can be seen that Inventive Example C recovers from sulfation, whereas Comparative Example B does not recover from sulfation.

$SO_2$ Emissions—Comparison of Comparative Example A with Inventive Example C

The $SO_2$ emissions from sulfated Comparative Example A and Inventive Example C are shown in FIG. 8. It can be seen that both Examples release similar amounts of $SO_2$ following high temperature lean desulfation with inlet temperatures around 650° C. The generation of a favorable temperature (i.e. an exotherm) is also similar for both catalysts.

$SO_2$ Emissions—Comparison of Comparative Example B with Inventive Example C

The $SO_2$ emissions from sulfated Comparative Example B and Inventive Example C are shown in FIG. 9. It can be seen that only Inventive Example C releases $SO_2$ following high temperature lean desulfation, even though inlet and bed temperatures were similar for both Examples.

CITED LITERATURE

Figure 1:
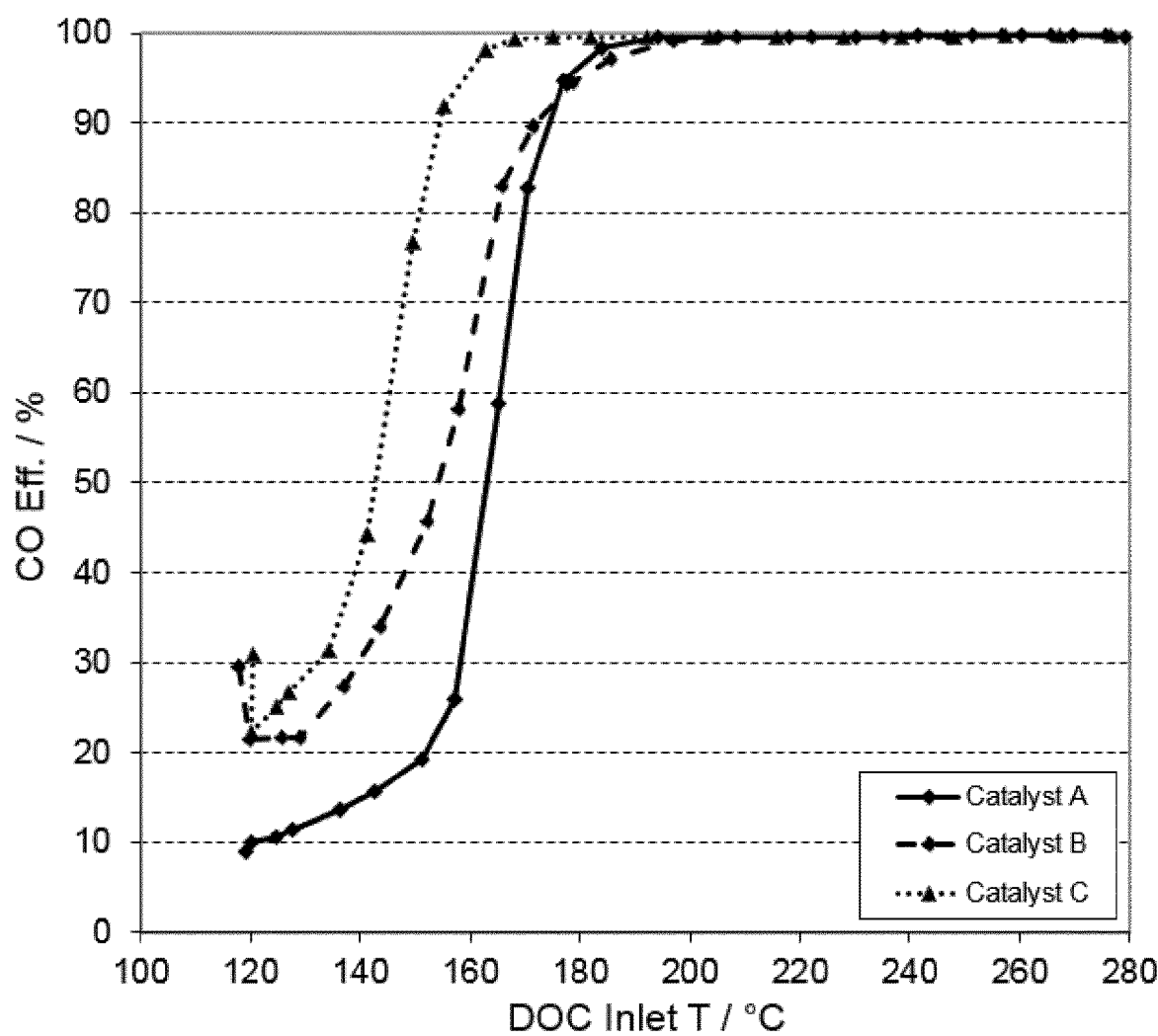
FIG. 1: shows the CO light-off curves for oven-aged Comparative Examples A and B as well as Inventive Example C. The CO oxidation efficiency is shown on the ordinate in % relative to the temperature in ° C. on the abscissa.
Figure 2:
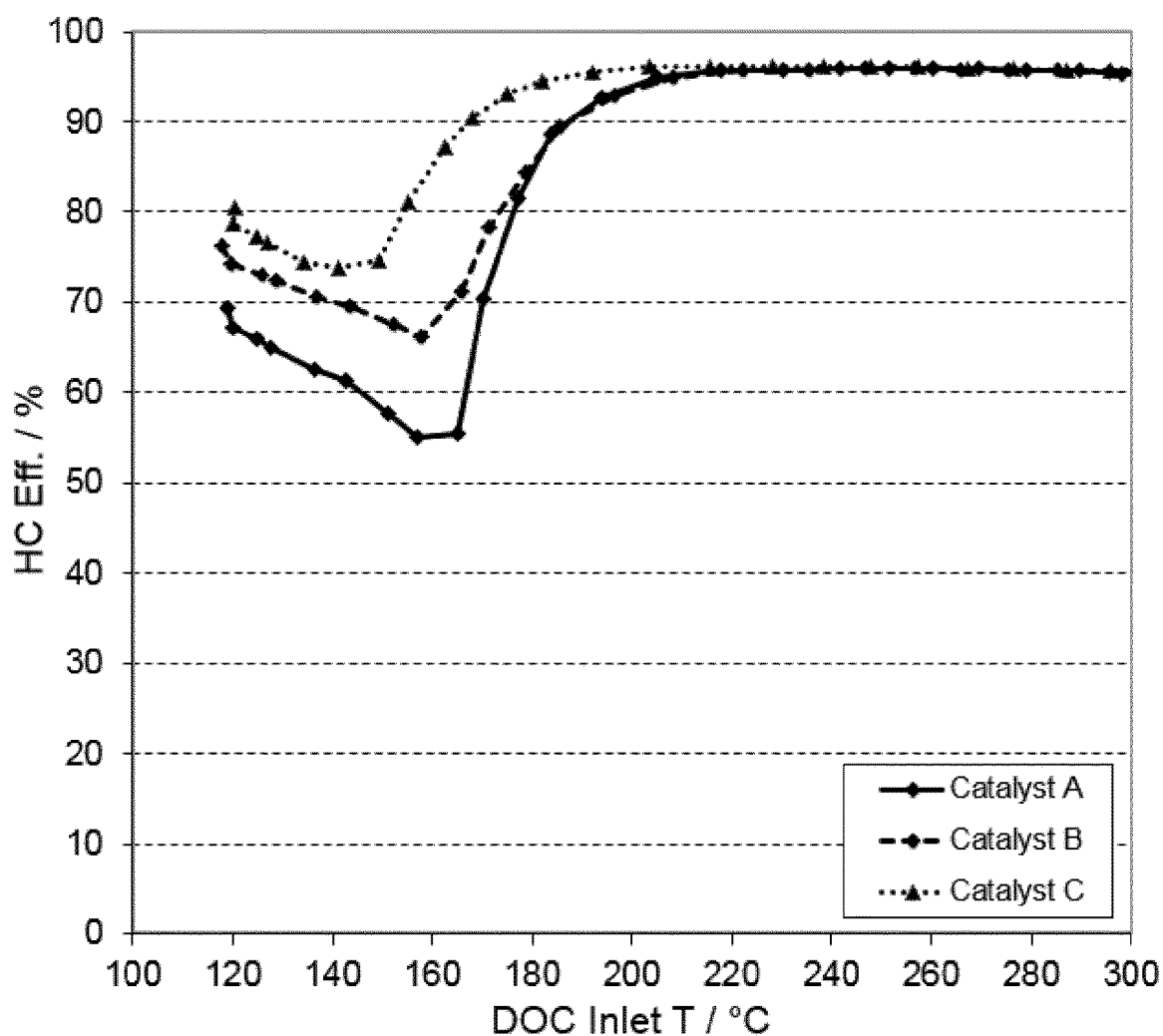
FIG. 2: shows the HC light-off curves for oven-aged Comparative Examples A and B as well as Inventive Example C. The HC oxidation efficiency is shown on the ordinate in % relative to the temperature in ° C. on the abscissa.
Figure 3:
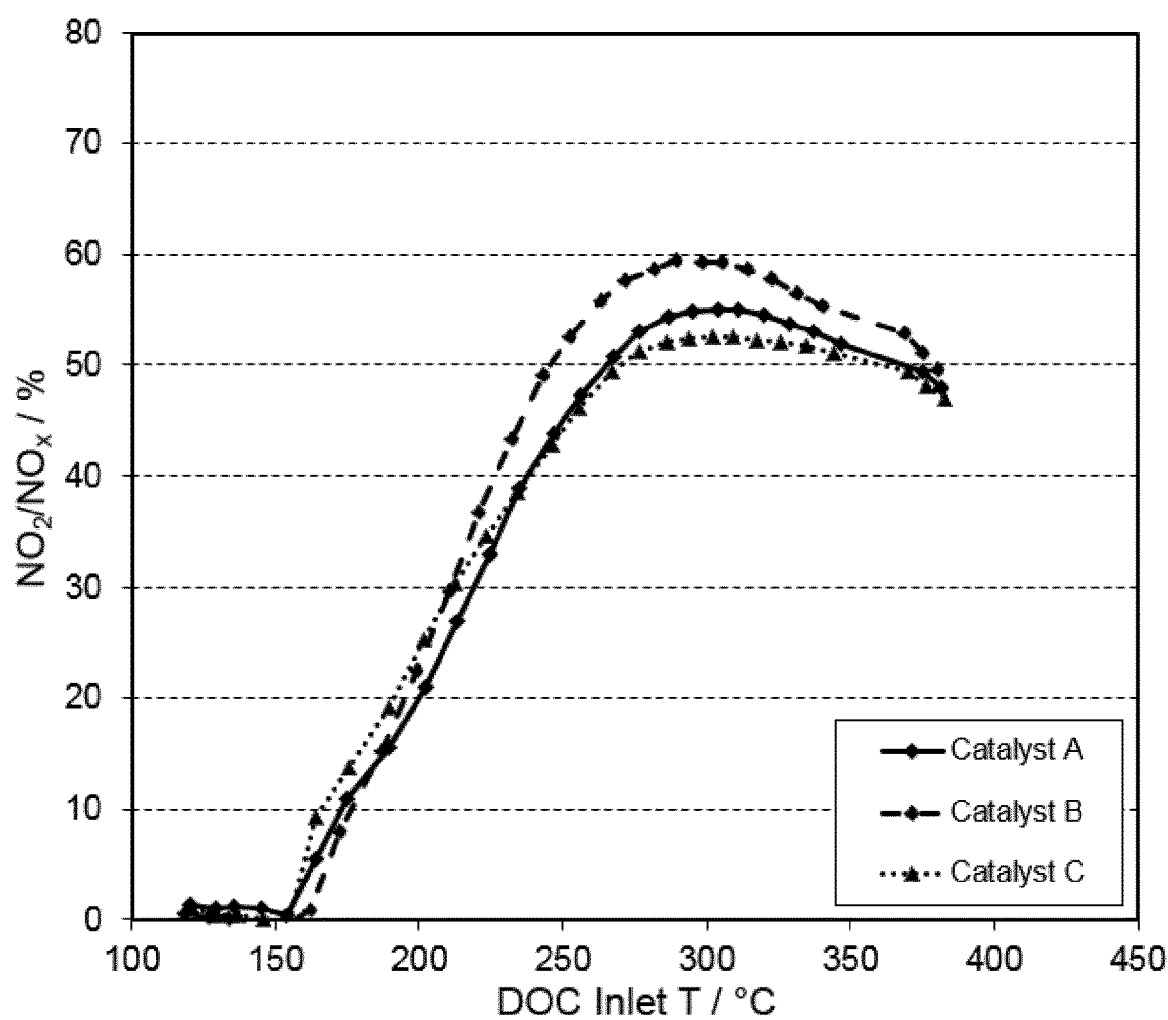
FIG. 3: shows the $NO_2/NOx$ light-off curves for oven-aged Comparative Examples A and B as well as Inventive Example C. The ratio $NO_2/NO_x$ is shown is shown on the ordinate in % relative to the temperature in ° C. on the abscissa.
Figure 4:
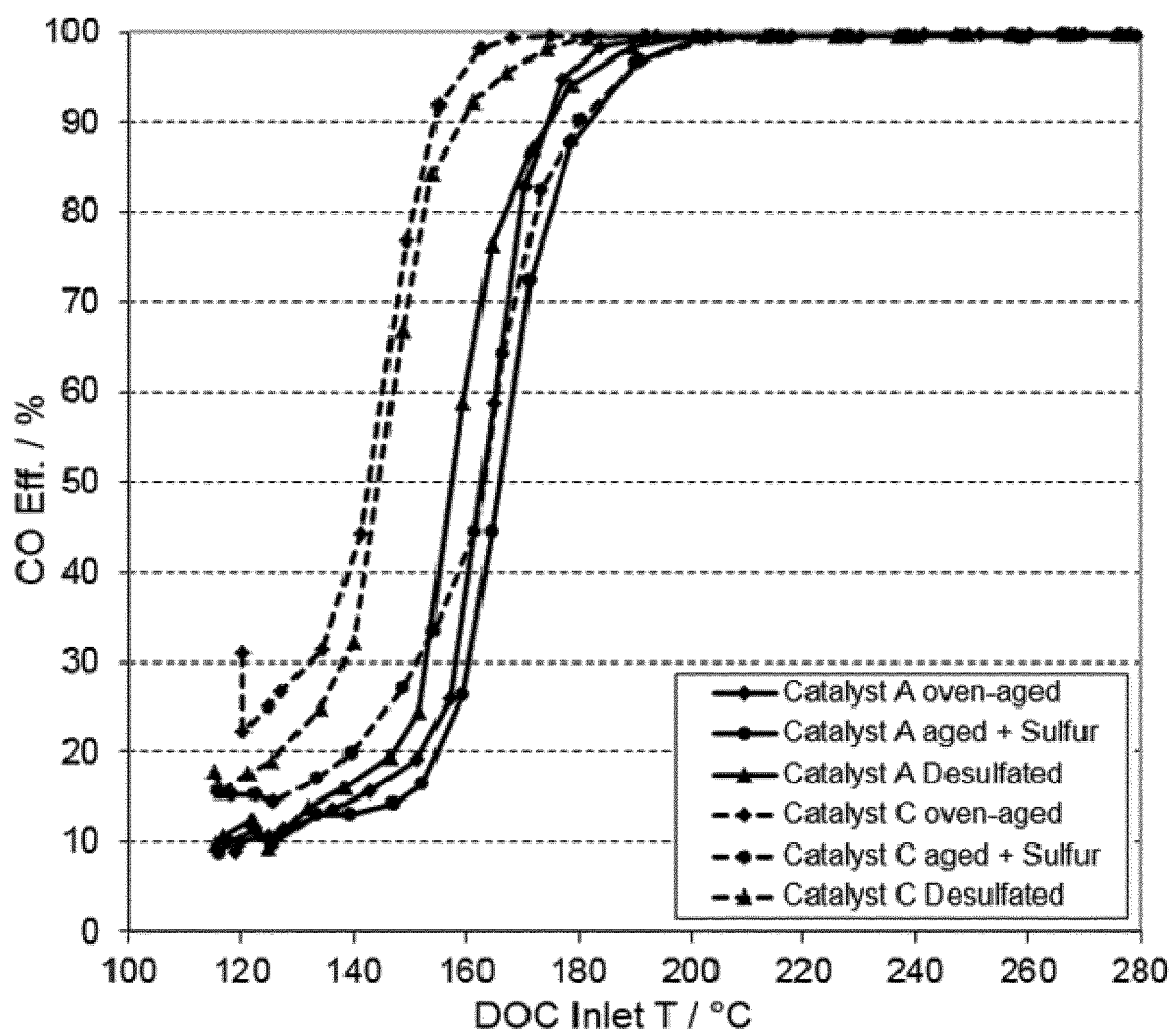
FIG. 4: shows the CO light-off curves for oven-aged, sulfated and de-sulfated Comparative Example A and Inventive Example C. The CO oxidation efficiency is shown on the ordinate in % relative to the temperature in ° C. on the abscissa.
Figure 5:
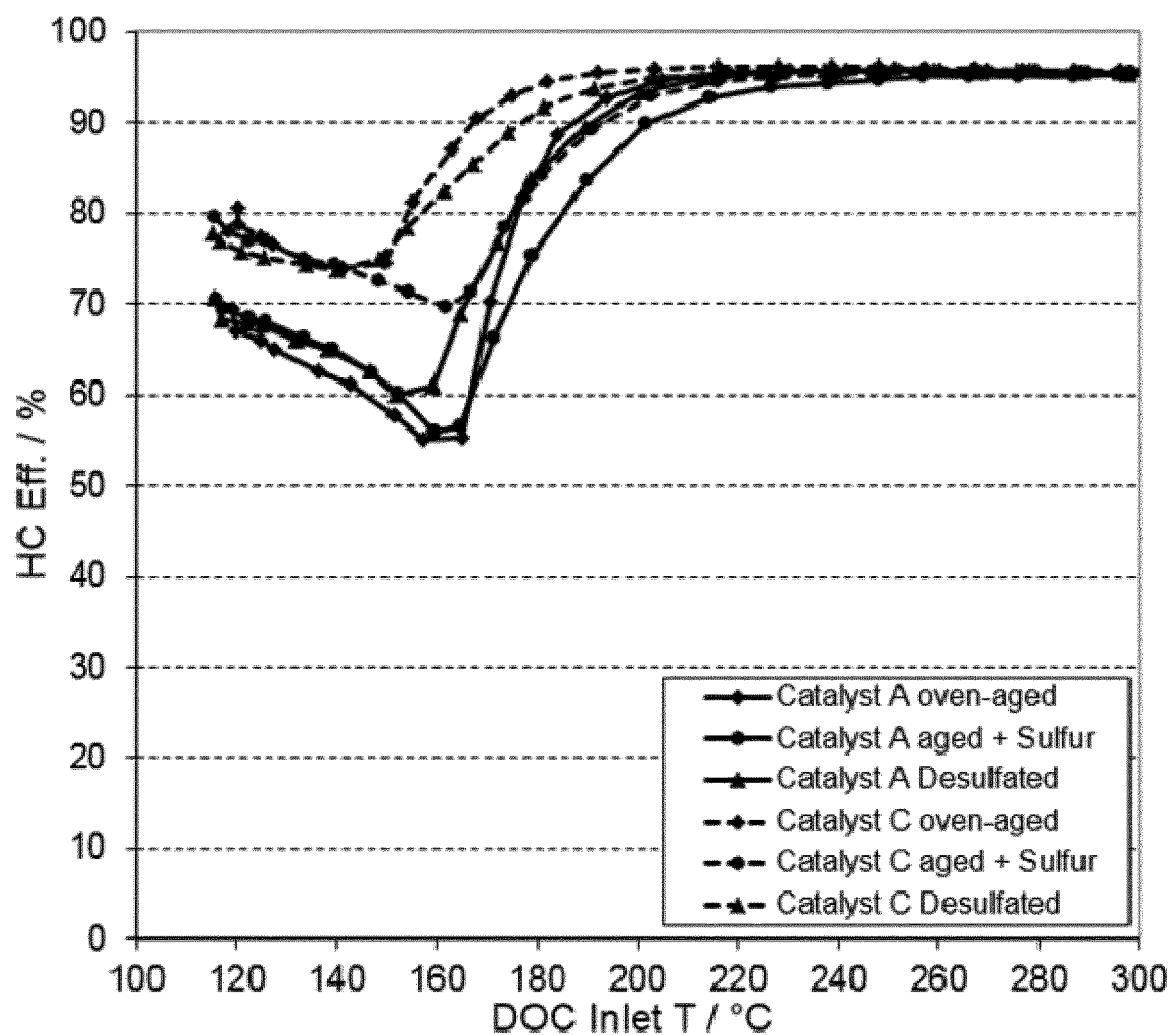
FIG. 5: shows the HC light-off curves for oven-aged, sulfated and de-sulfated Comparative Example A and Inventive Example C. The HC oxidation efficiency is shown on the ordinate in % relative to the temperature in ° C. on the abscissa.
Figure 6:
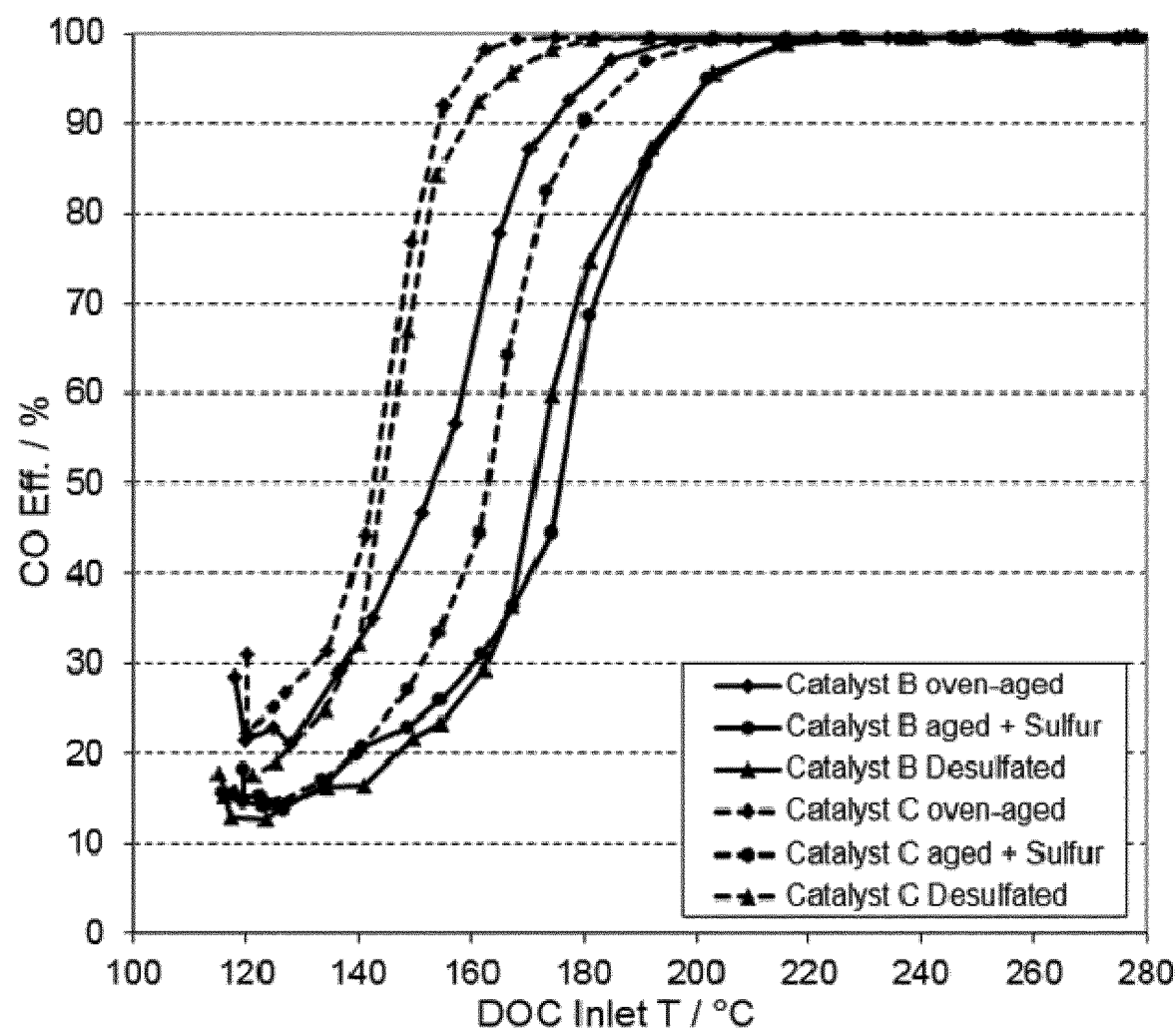
FIG. 6: shows the CO light-off curves for oven-aged, sulfated and de-sulfated Comparative Example B and Inventive Example C. The HC oxidation efficiency is shown on the ordinate in % relative to the temperature in ° C. on the abscissa.
Figure 7:
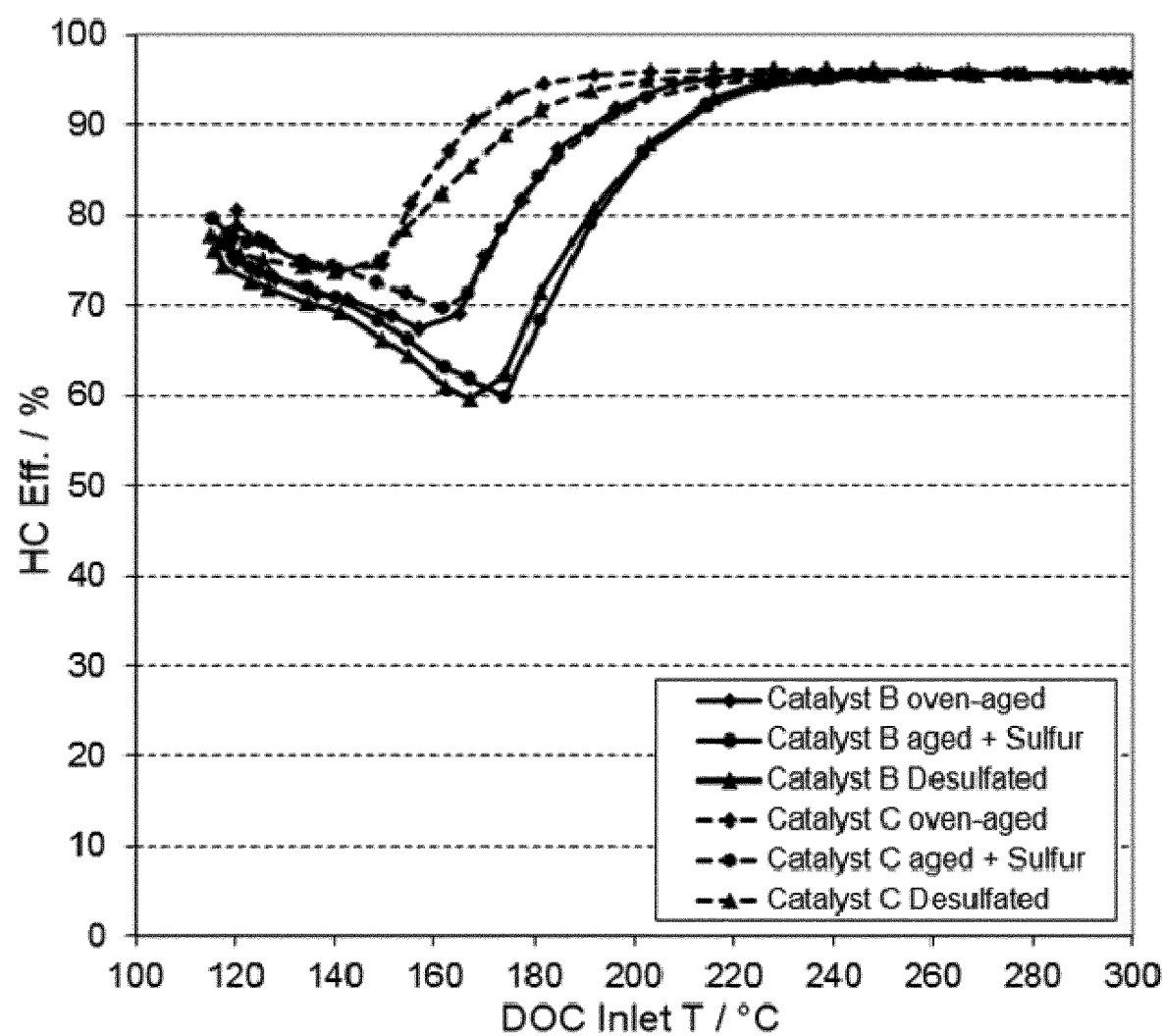
FIG. 7: shows the HC light-off curves for oven-aged, sulfated and de-sulfated Comparative Example B and Inventive Example C. The HC oxidation efficiency is shown on the ordinate in % relative to the temperature in ° C. on the abscissa.
Figure 8:
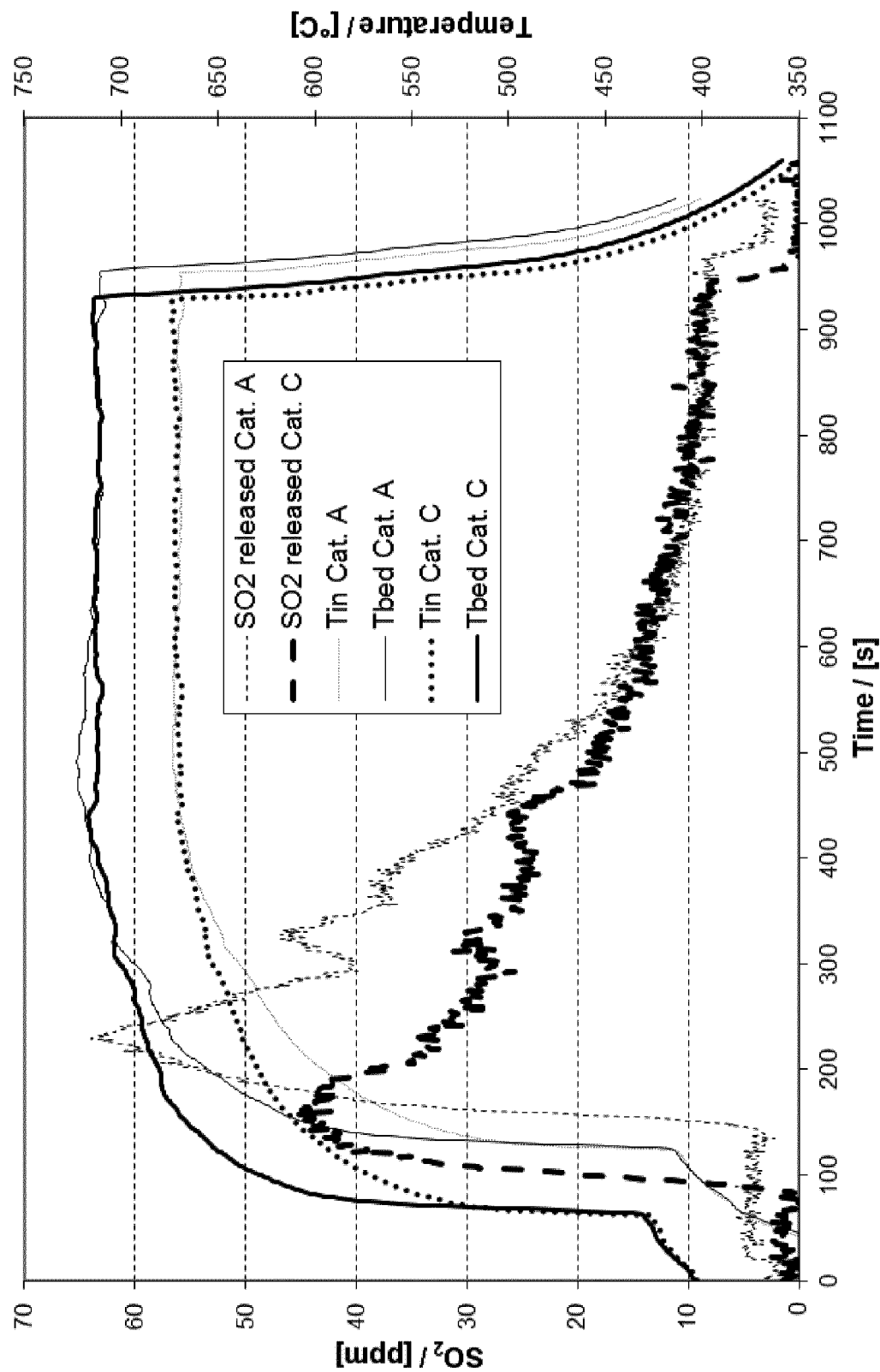
FIG. 8: shows the $SO_2$ emissions from sulfated Comparative Example A and Inventive Example C. The $SO_2$ emission is shown on the left ordinate in ppm and the temperature is shown on the right ordinate, whereas the time in s is shown on the abscissa.
Figure 9:
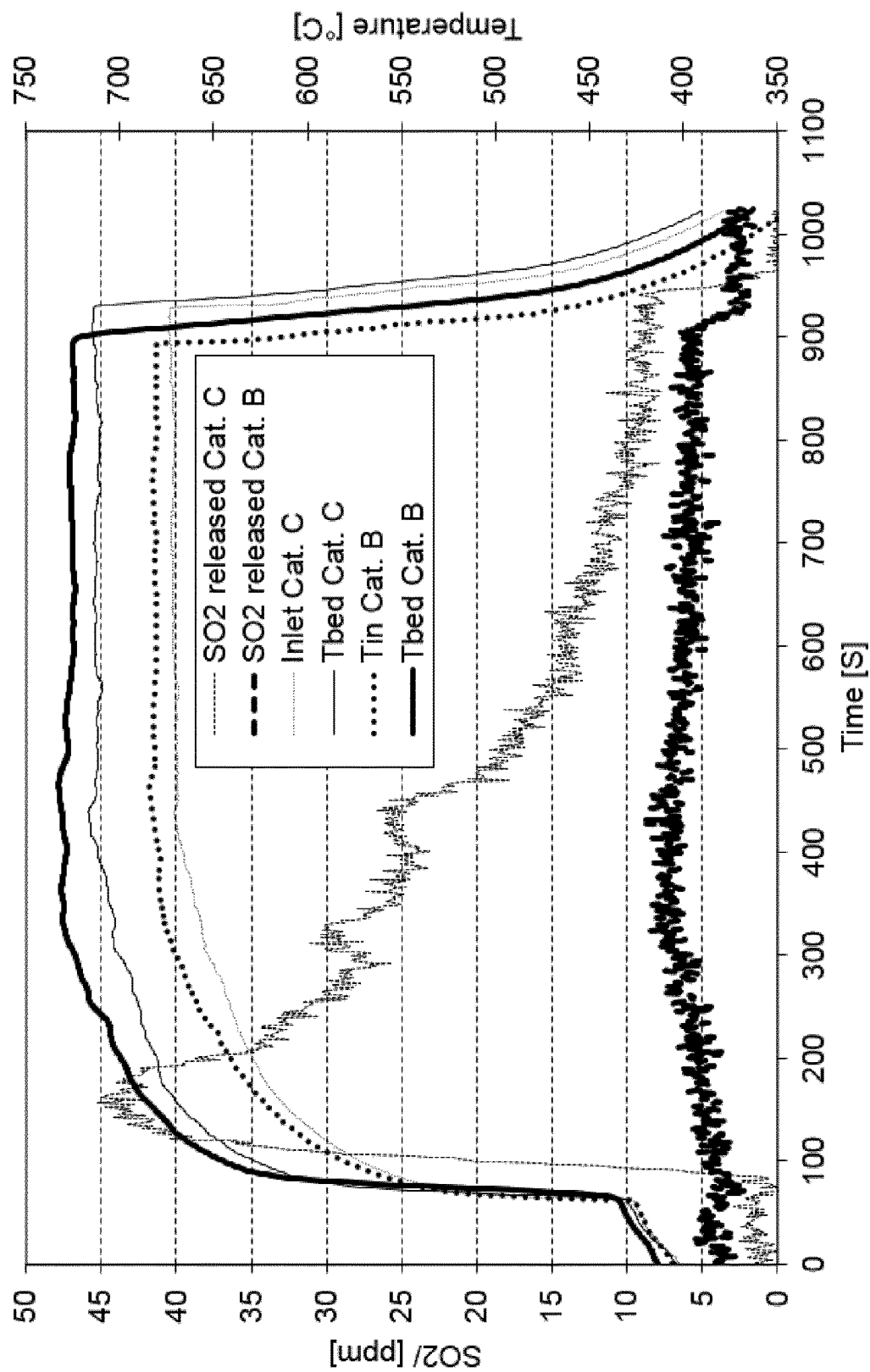
FIG. 9: shows the $SO_2$ emissions from sulfated Comparative Example B and Inventive Example C. The $SO_2$ emission is shown on the left ordinate in ppm and the temperature is shown on the right ordinate, whereas the time in s is shown on the abscissa.

WO 2013/042080 A1
WO 2015/095056 A1
WO 2017/019958 A1

The invention claimed is:

1. A diesel oxidation catalyst, comprising a washcoat comprising four layers, the washcoat being disposed on a substrate, wherein the washcoat comprises
   a first layer comprising a first platinum group metal supported on a first metal oxide support material, wherein the first layer is disposed on the substrate;
   a second layer comprising a second platinum group metal supported on a second metal oxide support material, and comprising a fifth platinum group metal, wherein the second layer is disposed on the first layer;
   a third layer comprising a third platinum group metal supported on a third metal oxide support material and comprising a zeolitic material comprising Fe and comprising a sixth platinum group metal;
   and a fourth layer comprising a fourth platinum group metal and a fourth metal oxide;
   wherein the substrate has a length, a front end and a rear end;
   wherein the first layer is disposed on the substrate on an entire length of the substrate,
   wherein the second layer is disposed on the first layer on the entire length of the substrate;
   wherein the third layer is at least partially disposed on the second layer on x % of the length of the substrate from the front end of the substrate;
   wherein the fourth layer is at least partially disposed on the second layer on y % of the length of the substrate from the rear end of the substrate;
   wherein x is in a range of from 30 to 70, y is in a range of from 30 to 70 and x+y is in a range of from 95 to 115.

2. The diesel oxidation catalyst of claim 1, wherein x is in a range of from 35 to 65.

3. The diesel oxidation catalyst of claim 1, wherein x+y is in a range of from 96 to 110.

4. The diesel oxidation catalyst of claim 1, wherein the first platinum group metal is one or more of Pt, Pd and Rh.

5. The diesel oxidation catalyst of claim 1, wherein the second platinum group metal is one or more of Pt, Pd and Rh.

6. The diesel oxidation catalyst of claim 1, wherein the third platinum group metal is one or more of Pt, Pd and Rh.

7. The diesel oxidation catalyst of claim 1, wherein a framework structure of the zeolitic material comprises a tetravalent element Y which is one or more of Si, Sn, Ti, Zr and Ge.

8. The diesel oxidation catalyst of claim 1, wherein the zeolitic material has a framework structure of the type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEl, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MIS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, mixtures of two or more thereof, and mixed types of two or more thereof.

9. The diesel oxidation catalyst of claim 1, wherein the zeolitic material comprises Fe, calculated as $Fe_2O_3$, in an amount in a range of from 0.5 to 6 weight %.

10. The diesel oxidation catalyst of claim 1, wherein one or more of the fourth platinum group metal, the fifth platinum group metal and the sixth platinum group metal is one or more of Pt, Pd and Rh.

11. The diesel oxidation catalyst of claim 1, wherein the fourth metal oxide is one or more of gamma-alumina, zirconia-alumina, silica-alumina, lanthana, lanthana-alumina, silica-zirconia-lanthana, alumina doped with manganese, alumina-zirconia-lanthana, titania, zirconia-titania, neodymia, praseodymia, ceria-zirconia, ceria-alumina, baria-ceria-alumina and ceria.

12. A process of oxidizing carbon monoxide, nitrogen monoxide, a hydrocarbon, or a mixture thereof, the process comprising contacting the carbon monoxide, the nitrogen monoxide, or the mixture thereof with the diesel oxidation catalyst of claim 1.

13. An exhaust gas treatment system, comprising the diesel oxidation catalyst of claim 1.

14. A process for preparing the diesel oxidation catalyst of claim 1, the process comprising:
- (a) disposing a first slurry on a substrate, obtaining a slurry-treated substrate, wherein the first slurry comprises the first platinum group metal supported on the first metal oxide support material;
- (b) drying the slurry-treated substrate obtained from (a), obtaining the substrate having a first layer disposed thereon;
- (c) optionally calcining the dried slurry-treated substrate obtained from (b);
- (d) disposing a second slurry on a substrate having a first layer disposed thereon, obtaining a slurry-treated substrate, wherein the second slurry comprises the second platinum group metal supported on the second metal oxide support material and comprises the fifth platinum group metal;
- (e) drying the slurry-treated substrate obtained from (d), obtaining the substrate having a first and a second layer disposed thereon;
- (f) optionally calcining the dried slurry-treated substrate obtained from (e);
- (g) disposing, on x % of the length of the substrate from the front end of the substrate, a third slurry on the substrate having a first and a second layer disposed thereon obtained from (e), optionally obtained from (f), obtaining a slurry-treated substrate, obtaining the substrate having a first, a second and a third layer disposed thereon, wherein the third slurry comprises the third platinum group metal supported on the third metal oxide support material and comprises the zeolitic material comprising Fe and comprises the sixth platinum group metal;
- (h) optionally drying the slurry-treated substrate obtained from (g);
- (i) optionally calcining the dried slurry-treated substrate obtained from (h);
- (j) disposing, on x % of the length of the substrate from the front end of the substrate, a fourth slurry on the substrate having a first, a second layer and a third layer disposed thereon obtained from (g), optionally obtained from (h) or (i), obtaining a slurry-treated substrate, wherein the fourth slurry comprises the fourth platinum group metal and the fourth metal oxide;
- (k) drying the slurry-treated substrate obtained from (j);
- (l) calcining the dried slurry-treated substrate obtained from (k), obtaining the substrate having a washcoat disposed thereon, said washcoat comprising the first, the second, the third and the fourth layer.

15. A diesel oxidation catalyst, obtainable or obtained by the process of claim 14.

* * * * *